(12) United States Patent
Yasumoto

(10) Patent No.: US 8,335,461 B2
(45) Date of Patent: Dec. 18, 2012

(54) BELT MEMBER FEEDING DEVICE AND IMAGE FORMING APPARATUS PROVIDED WITH THE SAME

(75) Inventor: Takeshi Yasumoto, Abiko (JP)

(73) Assignee: Canon Kabushiki Kaisha, Tokyo (JP)

(*) Notice: Subject to any disclaimer, the term of this patent is extended or adjusted under 35 U.S.C. 154(b) by 339 days.

(21) Appl. No.: 12/635,097

(22) Filed: Dec. 10, 2009

(65) Prior Publication Data

US 2010/0158568 A1 Jun. 24, 2010

(30) Foreign Application Priority Data

Dec. 22, 2008 (JP) .................. 2008-325793

(51) Int. Cl.
*G03G 15/01* (2006.01)
(52) U.S. Cl. ....................................... 399/302
(58) Field of Classification Search ............ 399/165, 399/302, 308, 121
See application file for complete search history.

(56) References Cited

U.S. PATENT DOCUMENTS

| | | | |
|---|---|---|---|
| 5,248,027 A | 9/1993 | Kluger et al. | |
| 5,365,321 A | 11/1994 | Koshimizu et al. | |
| 5,659,851 A | 8/1997 | Moe et al. | |
| 6,104,899 A * | 8/2000 | Hokari et al. | 399/165 |
| RE41,934 E * | 11/2010 | Maruta et al. | 399/227 |
| 2009/0033030 A1 | 2/2009 | Yasumoto | |

FOREIGN PATENT DOCUMENTS

| | | |
|---|---|---|
| EP | 0 733 957 A2 | 9/1996 |
| EP | 1 635 229 A2 | 3/2006 |
| EP | 1 731 454 A2 | 12/2006 |
| JP | 9-169449 | 5/1997 |
| JP | 10-227342 A | 8/1998 |
| JP | 11-102126 | 4/1999 |
| JP | 2001-075427 A | 3/2001 |
| JP | 2001-146335 | 5/2001 |
| JP | 2001-147599 | 5/2001 |
| JP | 2001-147599 A | 5/2001 |

(Continued)

OTHER PUBLICATIONS

Official Communication issued by the European Patent Office, dated Oct. 28, 2011, in European Patent Application No. 09180157.1.

(Continued)

*Primary Examiner* — David Gray
*Assistant Examiner* — Gregory H Curran
(74) *Attorney, Agent, or Firm* — Fitzpatrick, Cella, Harper & Scinto

(57) ABSTRACT

An image forming apparatus includes a rotatable belt member; stretching means for stretching the belt member; steering means for stretching and steering the belt member, wherein the steering means includes a rotatable portion rotatable with rotation of the belt member, a frictional portion, provided at each of opposite axial end of the rotation portion, for slidable contact with the belt member, supporting means for supporting the rotatable portion and the frictional portion, a rotation shaft rotatably supporting the supporting means, and the steering means is capable of steering the belt member by rotation thereof by forces resulting from sliding between the belt member and the frictional portion, wherein each of the frictional portions is provided with an inclined surface which is inclined to be further from a rotational axis of the rotation portion axially toward an outside, and wherein the belt member is contacted to at least one of the inclined portions.

9 Claims, 13 Drawing Sheets

FOREIGN PATENT DOCUMENTS

| | | |
|---|---|---|
| JP | 2001-520611 | 10/2001 |
| JP | 2002-132057 A | 5/2002 |
| JP | 2002-173212 | 6/2002 |
| JP | 2007-15858 | 1/2007 |
| JP | 2008-268954 | 11/2008 |
| KR | 10-2005-0055063 A | 6/2005 |
| WO | 97/19009 A2 | 5/1997 |

OTHER PUBLICATIONS

Decision on Grant Patent for Invention.
Notice of Allowance dated Apr. 25, 2012, issued by the Korean Patent Office, in Korean Patent Application No. 10-2009-0128840.
Notification of Second Office Action, dated Apr. 27, 2012, issued by The State Intellectual Property Office of P.R. China, in counterpart Chinese Patent Application No. 200910258185.5.

* cited by examiner (a)

(b)

(a)

(b)

(a)

(b)

BELT MEMBER FEEDING DEVICE AND IMAGE FORMING APPARATUS PROVIDED WITH THE SAME

FIELD OF THE INVENTION AND RELATED ART

The present invention relates to a belt feeding device for feeding a belt member used for an image formation. More specifically, the present invention relates to a belt unit for feeding an intermediary transfer belt, the transfer belt, a photosensitive belt, and so on and an image forming apparatus such as a copying machine, a printer, a printer provided with such a belt unit. The present invention is suitable for a belt member (transportation belt for a recording material, fixing belt for a fixing device, for example) which is not directly used for the image formation.

Recently, with an improvement in the speed in the image forming operation of the image forming apparatus, a plurality of image forming stations are disposed on an endless belt shape image bearing member, and the image formation processes of the multi-color for are processed-like in parallel. For example, the intermediary transfer belt in a full color image forming apparatus of an electrophotographic type is the typical example thereof. Onto the intermediary transfer belt, the different color toner images are sequentially superimposedly transferred onto the belt surface, and a color toner image is transferred all together onto a recording material. This intermediary transfer belt is stretched by the a plurality of stretching members which include a driving roller and is rotatable. As for such a belt member, the problem of offsetting toward one side of the widthwise end portions at the time of a travelling is involved depending on a diametral accuracy of the roller or an alignment accuracy between the rollers and so on.

In order to solve such the problem, Japanese Laid-open Patent Application Hei 9-169449 proposes a steering roller control by an actuator. In addition, Japanese Laid-open Patent Application 2001-146335 proposes a belt offset regulating member.

However, Japanese Laid-open Patent Application Hei 9-169449 requires a complicated control algorithm, and electrical components such as the sensor and the actuator used result in the high cost. Japanese Laid-open Patent Application 2001-146335 does not require the sensor and the actuator, but since the regulating member always receives the offsetting force from the belt member during the feeding, it is the limitation in increasing of the speed of the image forming apparatus. Moreover, for a mounting accuracy of the regulating member, the inspection and the management cost increases.

Under the circumstances, Japanese Patent Application Publication 2001-52061 proposes a system, wherein (automatic alignment) for which the steering roller carries out the belt alignment automatically by a balance of the frictional force a 1 and, wherein the number of parts is small, the structure is simple and the cost is low.

The device of the Japanese Patent Application Publication 2001-520611 is provided with a steering system as shown in FIG. 9. A steering roller 97 has a followable central roller portion 90 with the rotation of the belt member and the non-followable end members 91, and is supported by a supporting plates 92 rotatable in the direction of an arrow S relative to a steering shaft 93 provided at a central portion. Here, the supporting plates 92 are urged in the direction of arrow K by tension application means 95 compressed by a pressure releasing cam 96, and as a result, an outer surface of the steering roller applies a tension to an unshown belt member inner surface.

Referring to FIG. 10, the principle of the belt automatic alignment will be described.

As has been described hereinbefore, the end members 91 are non-followable, and therefore, the inside of the belt feeding always receives a frictional resistance from the inner surface of the belt member.

In (a) of FIG. 10, a belt member 50 driven in a direction of arrow V wraps, with a wrapping angle θS, on the end members 91. Here, as for the width (measured in direction perpendicular to the sheet of the drawing), a unit width is taken. As to a belt length corresponding to an infinitesimal wrapping angle dθ of a wrapping angle θ, a upstream side thereof is a loose side, and a tension there is T, and a downstream side thereof is a tight side, and the tension there is T+dT. these tension forces face in a tangential direction. Therefore, in the infinitesimal belt length, approximately Tdθ is applied in a centripetal direction of the end members 91 by the belt. When a friction coefficient of the end members 91 is μS, a frictional force dF is:

$$dF = \mu_S T d\theta \qquad (1)$$

Here, tension T is governed by a unshown driving roller, and when the driving roller has the friction coefficient μr, $$dT = \mu_r T d\theta \qquad (2)$$

That is, $$\frac{dT}{T} = -\mu_r d\theta \qquad (2')$$

When the formula (2') is integrated with respect to the wrapping angle θS, the tension T is:

$$T = T_1 e^{-\mu_r \theta} \qquad (3)$$

Here, T1 is the tension at θ=0.

From equations (1) and (3), $$dF = \mu_S T_1 e^{-\mu_r \theta} d\theta \qquad (4)$$

As shown in (a) of FIG. 10, in the case where the direction of a rotation of a supporting table relative to a steering shaft is the direction of an arrow S, a position of the winding start (θ=0) is the position inclined by an angle of deviation α relative to the rotational direction. Therefore, the a downward S direction component of the force expressed by formula (4) is $$dF_S = \mu_S T_1 e^{-\mu_r \theta} \sin(\theta + \alpha) d\theta \qquad (5)$$

Moreover, by integrating formula (5) with respect to the wrapping angle θS, $$F_s = \mu_s T_1 \int_0^{\theta_s} e^{-\mu_r \theta} \sin(\theta + \alpha) d\theta \qquad (6)$$

In this manner, the force (per unit width) in the direction of downward arrow S received from the belt member by the end member 91 in the inside of the belt feeding is obtained.

(b) of FIG. 10 is a top plan view of (a) of FIG. 10, as seen in the direction of an arrow TV. It is assumed that as shown in FIG. 10(b), when the belt member 50 is fed in the direction of arrow V, the belt leftwardly offsets. At this time, a relation between the riding widths of the belt member 50 on the end members is, such that the riding width w exists only in left-hand side, as shown in (b) of FIG. 10. More particularly, the left end member 91 receives the force FSw in the downward direction of S, and the right end member 91 receives the force 0 in the same direction. Such a difference in a frictional forces at the ends produces a moment FSwL about the steering shaft (downward at the left side). Hereinafter, the moment about the steering shaft will be called a steering torque.

The direction of a steering angle of the steering roller 97 produced by the above described principle is the direction by which the off-set of the belt member 50 is reduced, and therefore, the automatic alignment is accomplished.

In the automatic alignment for the belt which does not use an actuator, the steering forces are frictional forces produced by the end members 91. As is disclosed in the Japanese Patent Application Publication 2001-520611, or as will be apparent also from the principle based on formula (6), the steering force FS increases with the value of the friction coefficients $\mu S$ of the end members 91.

The large steering force FS, that is the large steering torque FSwL means high in the correcting effect for the belt offsetting, but they cause a large change in a stretching orientation of the belt member 50. A temporal change (change with time) of such a stretching orientation causes the color misregistration in a main scanning direction, in the case of the belt member (typically, intermediary transfer belt) related with the image forming operation. Therefore, as for the belt member 50 related with the image formation, it is necessary that both the problems of the belt offsetting and the color misregistration in the main scanning direction are considered, and therefore, the friction coefficient $\mu S$ cannot be increased simply.

Referring to FIGS. 12 and 13, the relation between the attitude change of the belt member 50 and the color misregistration in the main scanning direction will be described.

FIG. 12 is a top plan view of the belt member 50, wherein during the movement of the belt, the stretched attitude is constant. At the time t, the belt member 50 is stretched at the position indicated by a solid line around the rollers which include the driving roller 604 and the steering roller 97, with some inclinations $\gamma$ depending on an alignment error between the rollers and the like.

When the belt is fed in the direction of arrow V with the constant inclination $\gamma$, the belt member 50 is shifted to the position shown by a broken line at time t+δt. The position of a belt edge is detected in the detecting positions M1 and M2. The point Pt detected at the detecting position M1 at the time t and the point Pt+δt detected at the detecting position M2 at the time t+δt are the same mass points. For this reason, a relative difference between them is zero ideally.

When the belt is fed with the constant inclined attitude *$\gamma$, as shown in FIG. 12, the locus from the point Pt to the point Pt+δt goes straight in the x direction (sub-scanning direction), and therefore, it is in the ideal conditions, and the positional deviation does not occur in the y direction (main scanning direction) between the detecting positions M1 and M2.

On the other hand, FIG. 13 is a top plan view of the belt member 50 fed with the stretched attitude which is not constant. The belt member 50 is stretched with the inclination $\gamma$ at the position indicated by the solid line at the time t. When the belt is fed in the direction of arrow V with the changing inclination $\gamma$, the belt member 50 is moved to the position shown by the broken line at the time t+δt. Similarly to FIG. 12, the position of the belt edge is measured in the detecting positions M1 and M2. When the belt is fed with the changing inclination $\gamma$, the locus to the point Pt+δt from the point Pt is inclined relative to the x direction (sub-scanning direction). For this reason, the positional deviation occurs in the y direction (main scanning direction) between the detecting positions M1 and M2. Assuming that the detecting positions M1 and M2s are first color and second color image forming stations, respectively, the positional deviation in the main scanning direction occurs between the two colors (main scanning direction color misregistration). In this manner, in the case of the belt member 50 related to the image formation, the temporal change of the stretched attitude causes the main scanning direction color misregistration, and there is a correlation between the amount of the attitude change and the amount of the main scanning direction color misregistration.

FIG. 16 illustrates the change of a belt behavior, in the case where the end members 91 are made of silicone rubber which has a relatively high friction coefficient $\mu S$ ($\mu S$=approx. 1.0).

(a) of FIG. 16 illustrates a belt edge position detected in the detecting position M1 described in FIGS. 12 and 13 vs. time. (b) of FIG. 16 illustrates the main scanning position deviation which is the difference between the belt edge positions detected in the detecting positions M1 and M2 described in FIGS. 12 and 13 vs time. FIG. 16 shows the result of a transient response, when a disturbance is intentionally imparted at the time 0 (sec), in order to show clearly the production of the main scanning position deviation resulting from the belt automatic alignment.

The steering moment produced increases with increase of the friction coefficient $\mu S$, but the belt edge position is changed with a transient overshoot OS as shown in (a) of FIG. 16. The temporal change of the inclination of the tangent line as shown at the times t1, t2 and t3 in the graph of (a) of FIG. 16 is the temporal change of the stretched attitude described in FIGS. 12 and 13. More particularly, in (b) of FIG. 16, there is a produced peak which causes a first main scanning position deviation z1 between t=0 and the transient overshoot production time tos. Thereafter, there is a produced peak which causes a second main scanning position deviation z2 also between tos and the time of the steady state ts.

As will be understood, in the system which involves the transient overshoot OS, it is preferable that the steering is certainly turned back in the process to the steady state, and therefore, the additional the temporal change of the stretched attitude, that is, the production of the main scanning position deviation cannot be avoided.

In the example of (a) of FIG. 16, the steady state is reached only by the one transient overshoot, but when the friction coefficient $\mu S$ is high, n (n=integer) transient overshoots are required to reach to the steady state. In this case, the produced peaks which cause the first to n-th main scanning position deviations zn result. In the case of a full color image forming apparatus, the detecting positions M1 and M2 shown in FIGS. 12 and 13 correspond to the adjacent image forming stations which have the developing means for the different colors normally, and therefore, the main scanning position deviation is called the main scanning direction color misregistration.

As will be understood, in the system in which the belt member related with the image formation is automatically aligned, the friction coefficient $\mu S$ is the prime power of the steering, but in order to suppress the production of the main scanning direction color misregistration, the friction coefficient $\mu S$ cannot be increased too much.

For this reason, the function which produces a force which properly moves the belt member is desired with the small friction coefficient $\mu S$.

SUMMARY OF THE INVENTION

According to an aspect of the present invention and there is provided a mechanism and an image forming apparatus, wherein a suitable force which moves a belt member is produced with a small friction coefficient of a friction part.

According to an aspect of the present invention, there is provided a An image forming apparatus comprising a rotatable belt member; stretching means for stretching said belt member; and steering means for stretching and steering said belt member, wherein said steering means includes a rotatable portion rotatable with rotation of said belt member, a frictional portion, provided at each of opposite axial end of said rotation portion, for slidable contact with said belt member, supporting means for supporting said rotatable portion and said frictional portion, a rotation shaft rotatably supporting said supporting means, and said steering means is capable of steering said belt member by rotation thereof by forces resulting from sliding between said belt member and said frictional portion, wherein each of said frictional portions is provided with an inclined surface which is inclined to be further from a rotational axis of said rotation portion axially toward an outside, and wherein said belt member is contacted to at least one of said inclined portions.

These and other objects features and advantages of the present invention will become more apparent upon consideration of the following description of the preferred embodiments of the present invention, taken in conjunction with the accompanying drawings.

DESCRIPTION OF THE PREFERRED EMBODIMENTS (Embodiment 1)
<Image Forming Apparatus>

An image forming apparatuses according to the preferred embodiments of the present invention will be described in conjunction with the accompanying drawings.

Figure 6:
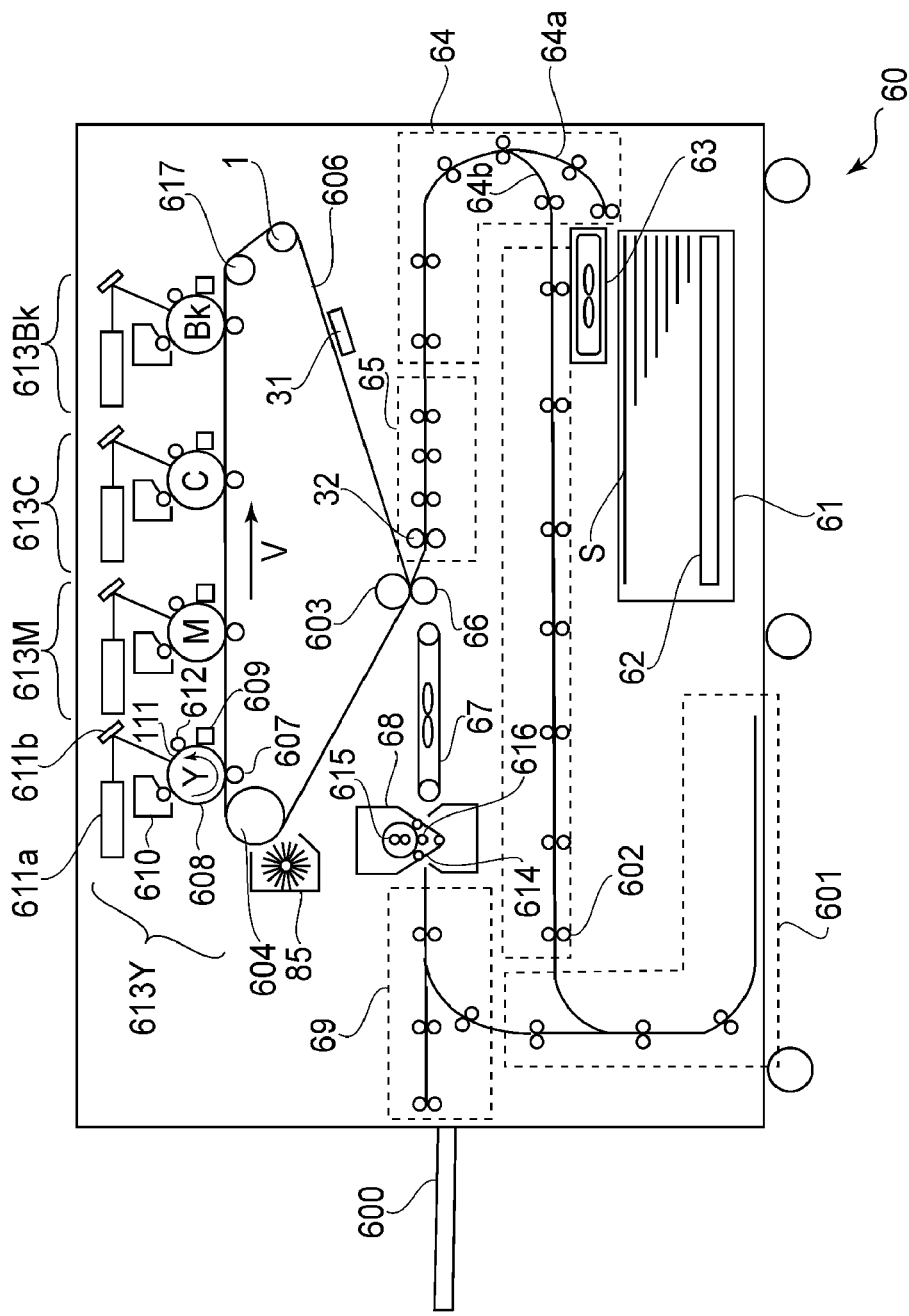
FIG. 6 is a sectional view of an image forming apparatus of an intermediate transfer type.

First, referring to FIG. 6, the operation of the image forming apparatus will be described. The image forming apparatus may be of an electrophotographic type, an off-set printing type, an ink jet type, and so on. In the example shown in FIG. 6, the image forming apparatus 60 is a color image forming apparatus of the electrophotographic type. The image forming apparatus 60 is of a so-called tandem intermediate transfer type, wherein on the intermediary transfer belt, four color image forming stations are juxtaposed. This is excellent in a thick paper processing and productivity. FIG. 6 is a sectional view of this device.

<Feeding Process for Recording Material>

Recording materials S are stacked on the lifting-up device 62 in the recording material accommodating portion 61, and is fed in timed relation with the image formation by a sheet feeding apparatus 63. The sheet feeding apparatus 63 may be of a friction separating type which uses a sheet feeding roller and so on or an attraction separating type which uses the air, and in the example of FIG. 6, the latter is used. The recording material S fed by the sheet feeding apparatus 63 passes along a feeding path 64a of a feeding unit 64 and is fed to a registration device 65. In the registration device 65, the recording material S is subjected to an inclination correction and a timing correction, and thereafter, it is fed to a secondary transfer portion. The secondary transfer portion includes an internal secondary transfer roller 603 which is a first secondary transfer member and an external secondary transfer roller 66 which is a second secondary transfer member, and a transfer nip portion is formed by these rollers opposing to each other. By applying predetermined pressure and electrostatic load bias, a toner image is transferred onto recording material S from the intermediary transfer belt.

<Image formation process> An image forming process to the secondary transfer portion is carried out in timed relation with the recording material feeding process to the secondary transfer portion described in the foregoing. This image forming process will be described In the present embodiment, there are provided an image forming station 613Y for forming the image by the yellow (Y) toner, an image forming station M for forming the image by the magenta (M) toner, an image forming station 613C for forming the image by the cyan (C) toner, and an image forming station 613BK for forming the image by the black (BK) toner. The image forming station 613Y, the image forming station 613M, the image forming station 613C, and the image forming station 613BK include the similar structures, except for the difference in colors of the toner, and therefore, only the image forming station 613Y will be described.

The image forming station 613Y which is toner image forming means comprises a photosensitive member 608 which is an image bearing member, a charger 612 for charging the photosensitive member 608, an exposure device 611a, a developing device 610, a primary transfer device 607 and a photosensitive member cleaner 609. The photosensitive member 608 is rotated in the direction of an arrow m in the Figure, and it is uniformly charged by the charger 612. The exposure device 611a is driven on the basis of a signal of an inputted image information and it impinges on the charged photosensitive member 608 by way of light bending members 611b to form an electrostatic latent image. The electrostatic latent image formed on the photosensitive member 608 is developed by the developing device 610, so that the toner image is formed on the photosensitive member. Thereafter, the yellow toner image is transferred onto the intermediary transfer belt 606 which is the belt member, by a predetermined pressure and a predetermined electrostatic load bias in the primary transfer device 607. Thereafter, an untransferred toner which remains on the photosensitive member 608 is removed and collected by the photosensitive member cleaner 609, to be prepared for a next image formation.

In the case of the image forming station 613 of FIG. 6 described in the foregoing, the image forming stations for the yellow (Y), the magenta (M), the cyan (C), and the black (Bk) are provided. By this, the magenta toner image formed by image forming station M is transferred onto the yellow toner image on an intermediary transfer belt 606. In addition, the cyan toner image formed by an image forming station C is transferred onto the formed magenta toner image. Furthermore, the black toner image formed by an image forming station BK is transferred onto the intermediary transfer belt 606 onto the cyan toner image. In this manner, the different color toner images are superimposedly formed on the intermediary transfer belt 606, so that a full-color image is formed on the intermediary transfer belt 606. In this embodiment, the number of the colors is four, but it is not limited to four, and the order of the colors is not limited to this example.

The intermediary transfer belt 606 will be described. The intermediary transfer belt 606 is stretched by a driving roller 604 which is a driving member, a steering roller 1 which is steering means, a stretching roller 617 which is a stretching member, and the internal secondary transfer roller 603 which is an internal secondary transfer member (stretching member). It is driven in the direction of arrow V in the Figure. It is preferable that an angle in which the intermediary transfer belt 606 wraps on the stretching roller 617 which is a first stretching member adjacent the steering roller 1, and an angle in which the internal secondary transfer roller 603 which is a second stretching member are acute. This is because, a frictional force between the intermediary transfer belt 606 and the stretching roller 617 and a frictional force between the intermediary transfer belt 606 and the internal secondary transfer roller 603 can be reduced, and therefore, the efficiency in the belt automatic alignment as will be described hereinafter is high. The frictional force is large when the wrapping angle, on steering roller 1, of the intermediary transfer belt 606 is an obtuse angle, and therefore, the efficiency of the automatic belt alignment can be increased.

A function of a tension roller for applying a predetermined tension to the intermediary transfer belt 606 is allotted to the steering roller 1. The image forming processes carried out in parallel by the image forming stations 613Y, 613M, 613C, 613BK are timed so that the toner images are superimposed onto the upstream color toner image or images transferred (primary transfer) onto the intermediary transfer belt 606. As a result, finally a full-color toner image is formed on the intermediary transfer belt 606, and is fed to the secondary transfer portion. The number of the rollers which stretch the intermediary transfer belt 606 is not limited to that of FIG. 6.

<Process after Secondary Transfer>

The full-color toner image is formed on recording material S in the secondary transfer portion through the above described recording material feeding process and the image forming process. Thereafter, the recording material S is fed to the fixing device 68 by a pre-fixing feeding portion 67. As for a fixing device 68, various structures and types are available, but in the example of FIG. 6, a fixing roller 615 and a pressing belt 614 which oppose to each other are employed and they form a fixing nip. The nip gives the predetermined the pressure and heat to the recording sheet to melt and fix the toner image on recording material S. Here, the fixing roller 615 is provided with a heater which is a heat source in an inside, and the pressing belt 614 is provided with a plurality of stretching rollers and a pressing pad 616 urged from a belt inner surface. The recording material S which has passed through the fixing device is selectively fed by a branching feeding device 69 to the sheet discharge tray 600 or to an inversing device 601 (In the case of double-sided image formation). In the case of the double-sided image formation, the recording material S fed to the inversing device 601 is switched back and is fed from the trailing end to double-sided feeding device 602. Thereafter, while the recording material avoids the interference with a subsequent job recording material from the sheet feeding apparatus 61, it is fed to the secondary transfer portion through a re-feeding path 64b of the feeding unit 64. The image forming process for the back side is the same as that for the front surface, and therefore, the description is omitted.

<Structure of Steering System for Intermediary Transfer Belt>

Figure 5:
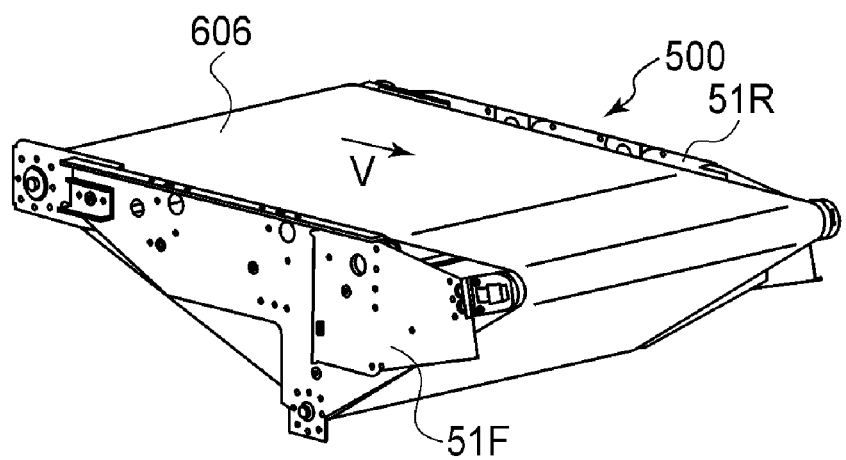
FIG. 5 is a perspective view of an intermediary transfer belt unit according to Embodiment 1 of the present invention.
Figure 5:
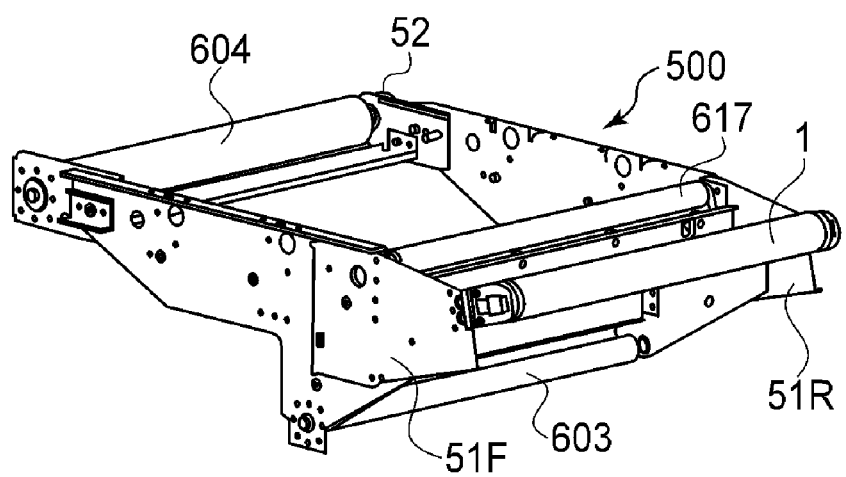

FIG. 5 is a perspective view of the intermediary transfer belt unit 500 which the image forming apparatus 60 shown in FIG. 6 has. FIG. 5(a) shows the intermediary transfer belt unit 500 when the intermediary transfer belt 606 of the belt unit 500 is in the stretched state. FIG. 5(b) shows the intermediary transfer belt unit 500 after the removal of the intermediary transfer belt 602. The intermediary transfer belt 606 is circularly moved in the direction indicated by an arrow mark V, by the belt driving force inputted into the drive roller 604 (belt driving member) through a drive gear (driving force transmitting member). In this embodiment, the steering roller 1, which is a steering means, is provided with a mechanism for automatically centering the intermediary transfer belt 606 by utilizing the unbalance in friction.

Figure 1:
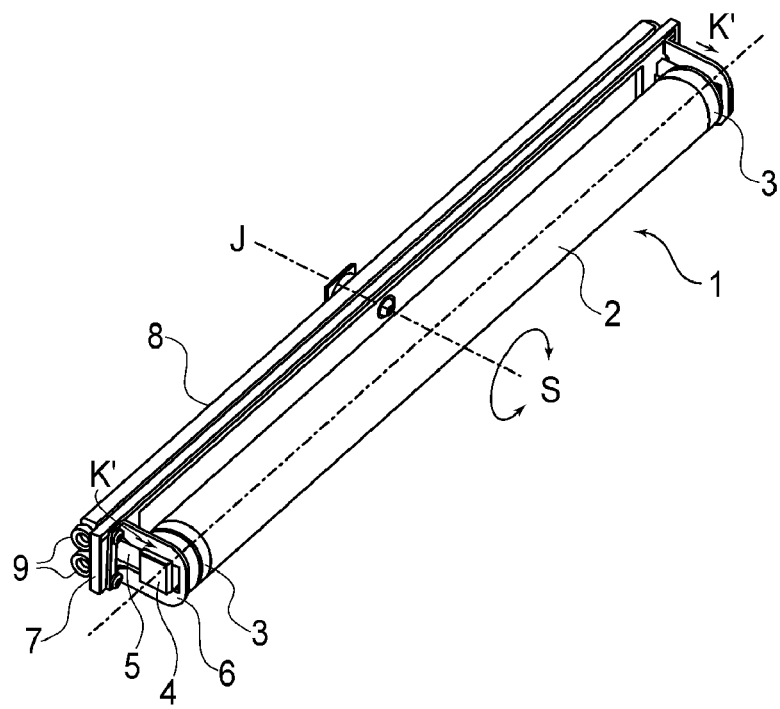
FIG. 1 is a perspective view of an automatic alignment mechanism portion according to an embodiment of the present invention.

FIG. 1 is a perspective view of the essential portion of the automatic belt centering mechanism in accordance with the present invention. The steering roller 1 has a follower roller 2 and a pair of friction rings 3. The follower roller 2 is the center portion of the steering roller 1, and is the rotational portion of the steering roller 1. The follower roller 2 is in connection with the friction rings 3, and is supported by the same shaft as the shaft with which the friction rings 3 are supported. The friction rings 3 are at the lengthwise ends of the follower roller 2, and are the portions for providing the intermediary transfer belt 500 with friction. The steering roller 1 is supported by its lengthwise ends, by a pair of sliding bearings 4. The sliding bearings 4 are in the groove (unshown) of a lateral supporting member 6, being kept pressed in the direction indicated by an arrow mark K', by a tension spring 5 (compression spring), which is an elastic member. Thus, the steering roller 1 functions also as the tension roller which provides the intermediary transfer belt 606 with such a tension that is applied in the direction indicated by the arrow mark K' through the inward surface of the intermediary transfer belt 606. Further, the lateral supporting member 6 and a rotational plate 7 make up a supporting plate (supporting means) for supporting the follower roller 2 and frictional rings 3. The lateral supporting member 6 is supported so that it is rotatable about the central axial line J, in the direction indicated by an arrow mark S. A frame stay 8 is one of the structural members of the frame portion of the intermediary transfer belt unit 500, and bridges between the front and rear plates 51F and 51R, respectively, of the intermediary transfer belt unit 500. The frame stay 8 is provided with slidably movable rollers 9, which are at the lengthwise ends of the frame stay 8, one for one. The slidably movable rollers 9 play the role of reducing the rotational plate 7 in rotational resistance.

<Details of Structure of Intermediary Transfer Belt Centering Automatic Mechanism>

Next, referring to FIGS. 2 and 3, the further details of the structure of the intermediary transfer belt centering automatic mechanism will be described.

Figure 2:
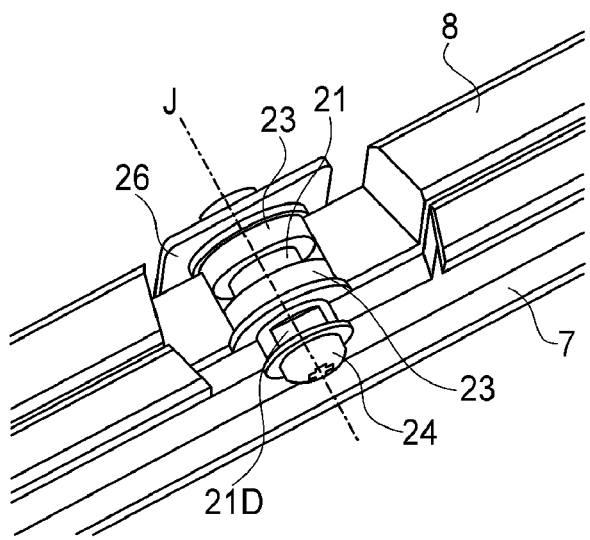
FIG. 2 is a detailed view of the central part of an automatic alignment portion in the embodiment of the present invention.

FIG. 2 is a partially sectional view of the rotational center portion of the supporting plate, and shows the structure of the rotational center portion. The steering mechanism is provided a steering shaft 21, which is fitted in the center portion of the rotational plate 7. The steering shaft 21 is shaped as if two D-shaped portions have been removed from the opposite sides of the shaft 21. It is integrally attached to the rotational plate 7 by one of its lengthwise ends, with small screws. The other lengthwise end of the steering shaft 21 is put through a bearing 23 held by the frame stay 8, and is fitted with a stopper 26 for preventing the steering shaft 21 from becoming disengaged by a thrust.

Figure 3:
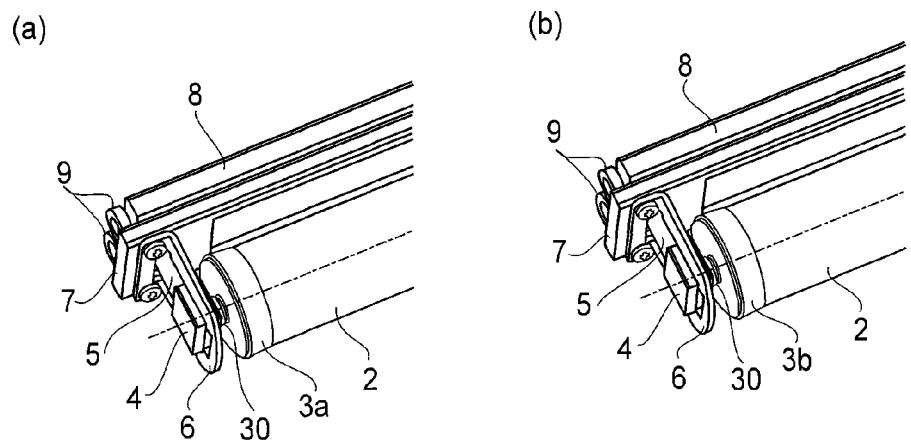
FIG. 3 is a detailed view of an end of the automatic alignment portion in the embodiment of the present invention.

FIG. 3 shows the details of one of the lengthwise end portions of the automatic belt centering mechanism in accordance with the present invention.

The friction ring 3a, which is the friction providing portion of the steering roller 1, is tapered in such a manner that its outward end, in terms of its axial direction, is the largest in diameter, and its inward end is smallest in diameter. However, it is not mandatory that the friction ring 3a is shaped as it is in this embodiment. For example, the friction ring 3a may be shaped so that its portion which does not come into contact with the intermediary transfer belt 606 is square in cross-section, and only its portion which comes into contact with the belt is tapered in such a manner that the outward end is largest in diameter. In other words, all that is required of the friction roller 3a, or the like, is to be provided with a portion tapered so that the more outward in terms of the direction of the roller shaft axis, the greater the distance between the rotational axis of the friction roller 3a, or the like, and the peripheral surface of the friction roller 3a, or the like.

The follower roller 2 is rotatably supported by the steering roller shaft 30, with the presence of the internal bearings of the follower roller 2 between the follower roller 2 and steering roller shaft 30. As for the friction rings 3a attached to the lengthwise ends of the follower roller 2, they also are supported by the steering roller shaft 30, but, are prevented by a parallel pin or the like, from rotating with the steering roller shaft 30. In this embodiment, the belt centering mechanism is structured so that the friction rings 3 do not rotate in the same direction as the rotational direction of the follower roller 2. However, it is not mandatory that the belt centering mechanism is structured as it is in this embodiment. For example, the belt centering mechanism may be structured so that the friction rings 3a are allowed to rotate. In a case where the friction rings 3a are allowed to rotate, as long as the mechanism is structured so that the amount of torque necessary to rotate the friction rings 3 in the same direction as the moving direction of the intermediary transfer belt 606 is greater than the amount of torque necessary to rotate the follower roller 2 in the same direction as the moving direction of the intermediary transfer belt 606, it is possible to steer the intermediary transfer belt 606.

One of the lengthwise end portions of the steering roller shaft 30 is shaped so that its cross-section is in the shaped of letter D. Thus, the steering roller shaft 30 is non-rotatably supported by the sliding bearing 4. Therefore, when the stretched intermediary transfer belt 606 is circularly moved, the rotatable portion 2 (follower roller) of the steering roller 1 does not rub the inward surface of the intermediary transfer belt 606, but, the frictional rings 3a, which are the lengthwise end portions, one for one, of the steering roller 1, rub the intermediary transfer belt 606. The principle of the belt centering automatic mechanism, which is based on the above described structural arrangement, is exactly as described above in (1)-(6).

Figure 4:
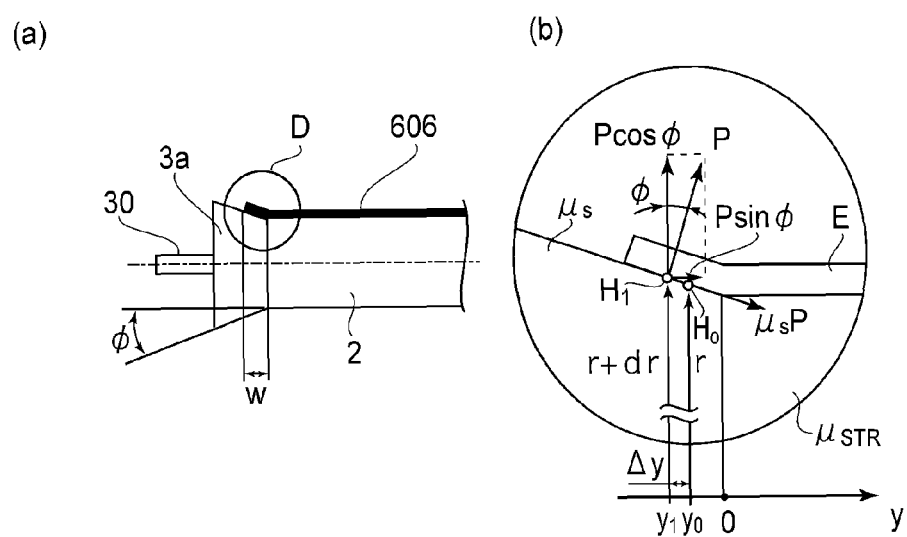
FIG. 4 illustrates the relation between the forces which function to the present invention at the time of an automatic alignment in the present embodiment.

Next, referring to FIG. 4, the structure of the belt centering automatic mechanism having the tapered friction rings 3a will be described in more detail. Referring to FIG. 4(a), the frictional ring 3a is tapered at an angle of $\phi$, and the more outward the given point of the peripheral surface of the friction ring 3a relative to the center of the steering roller 1 in terms of the axial line of the steering roller 1, the greater in external diameter the given point. The intermediary transfer belt 606 is suspended in such a manner that the area of contact between the frictional ring 3a and the intermediary transfer belt 606 has a width of W in terms of the lengthwise direction of the axial line of the steering roller 1. In this embodiment, the belt centering automatic mechanism is structured so that while the intermediary transfer belt 606 is stable in position in terms of the axial direction of the steering roller 1, the intermediary transfer belt 606 remains in contact with both of the friction rollers 3a, and the area of contact between each frictional ring 3a and the corresponding edge portion of the intermediary transfer belt 606 is W in width. Incidentally, the belt centering automatic mechanism is structured so that the intermediary transfer belt 606 is enabled to come into contact with the outermost edge of each friction ring 3a. However, if the intermediary transfer belt 606 is shifted in position far enough for one of its edges to be placed outside the outward edge of the friction ring 3a, it becomes difficult for the intermediary transfer belt 606 to be corrected in position (centered).

FIG. 4(b) is an enlarged sectional drawing of one of the edge portion of the intermediary transfer belt 606, which is in contact with the corresponding friction ring 3a by the width of W (D portion). It shows the relationship between the deviatory force P by which the intermediary transfer belt 606 is pushed outward, and the force which works in the direction to center the intermediary transfer belt 606. In this embodiment, the angle $\phi$ of the tapering of the friction ring 3a is approximately 8° ($\phi \approx 8°$). It is desired that the angle $\phi$ of the tapering is greater than 0° and no more than 90°:$0° < \phi < 90°$, preferably, $0° < \phi < 30°$.

<Forces Which Act on Intermediary Transfer Belt (Member in Belt Form)>

Figure 12:
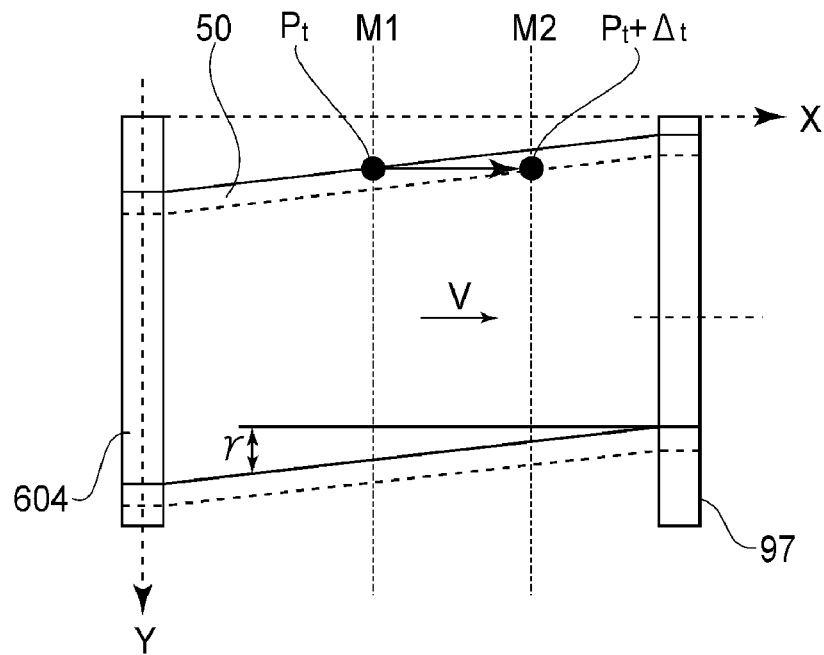
FIG. 12 is a top plan view (1) illustrating the relation between a belt offsetting and a main scanning position deviation.

Generally speaking, the belt deviation occurs because of the occurrence of the difference $\gamma$ in angle between the direction in which the intermediary transfer belt 606 belt is circularly moved, and the direction in which the belt 606 is suspended (stretched), as described with reference to FIG. 12. Further, there is a correlation between the amount of the deviation and the angle $\gamma$. In a case where a means, such as the tapered portion of the friction ring 3a in this embodiment, for resisting the force which acts in the direction to cause the belt 606 to deviate, is present, the amount of the belt deviation may be thought to be the amount of the deviatory force P which acts in the direction to cause the belt 606 to deviate. FIG. 4(b) is drawn in such a manner that the border between friction ring 3a and follower roller 2 is the referential point (Point 0) of the axis y. It is assumed that the intermediary transfer belt 606 is deviated so that a given point of the inward surface of the intermediary transfer belt 606, which was at the intersection H0 between the inward surface of the intermediary transfer belt 606 and the cross-sectional plane y0 ($y = y0$), was moved by an amount $\Delta y$ (distance) to a point H1. At point H1, the given point catches a reactive force P', which is perpendicular to the peripheral surface of the tapered friction ring 3a. The relationship among the abovementioned forces can be summarized as follows, with reference to axis y.

(1) Reactive Force from Tapered Friction Ring

Figure 10:
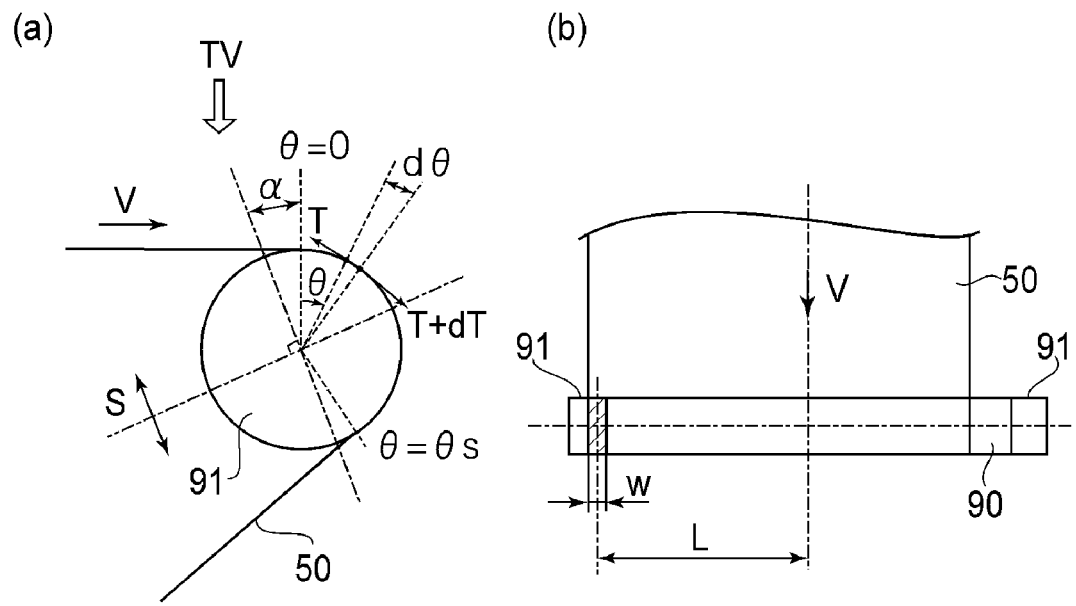
FIG. 10 illustrates a principle of the belt automatic alignment.

In the case of the belt centering system in which the friction ring 3a is tapered at the angle of φ, the component of the deviatory force P, the direction of which is parallel to axis y, acts on the intermediary transfer belt 606 across the portion of the intermediary transfer belt 606, which corresponds to an angle θs (FIG. 10(a)).

Thus, $$F_1 = \theta_S P \sin\phi \quad (7)$$

(2) Friction Attributable to Reactive Force from Tapering of Friction Ring

The component of the friction which is parallel to axis y, and is perpendicular to the deviatory force P, acts on the intermediary transfer belt 606 across the wrapping angle θs.

Therefore, $$F_2 = \theta_S \mu_S P \cos\phi \quad (8)$$

Here, μs is the coefficient of friction of the peripheral surface of the friction ring 3a.

(3) Reactive Force Caused by Tensional Stress of Intermediary Transfer Belt

The amount of tensional stress which acts on the intermediary transfer belt 606 at point y0 (y=y0) and y1 (y=y1) can be expressed in the form of the following mathematical equation, in which r and (r+dr) stands for radii of the friction ring 3a at points y0 and y1, respectively:

$$\sigma = E\frac{dr}{r} \quad (9)$$
$$= E\frac{\Delta y}{r}\tan\phi$$

Regarding a given small portion of the peripheral surface of the friction ring 3a, the width of which is dθ in angle, the amount of the component q which is perpendicular to the peripheral surface of the friction ring 3a, and the amount of which is obtainable from Equation (9);

$$q = \sigma d\theta \quad (10)$$

The force df, which was described in Sections (1) and (2), is similarly generated also by force q.

Thus, $$df = q\sin\phi + \mu_S q\cos\phi \quad (11)$$

Therefore, the reactive force F3 can be obtained from Mathematical Equations (9)-(11).

[Mathematical Equation 10]

$$F_3 = \int_0^{\theta_s} df \quad (12)$$
$$= \int_0^{\theta_s} E\frac{\Delta y}{r}\tan\phi(\sin\phi + \mu_s\cos\phi)d\theta$$
$$= \theta_s E\frac{\Delta y}{r}\tan\phi(\sin\phi + \mu_s\cos\phi)$$

Here, E stands for the coefficient of tensional elasticity of the intermediary transfer belt 606.

(4) Static Frictional Force of Follower Roller

When the intermediary transfer belt 606 is being returned to its normal position, the frictional force which the intermediary transfer belt 606 receives from the peripheral surface of the follower roller 2 functions as resistive force F4. When the coefficient of static friction of the peripheral surface of the follower roller 2 is μSTR, and the perpendicular resistive force is N, $$F_4 = \mu_{STR} N \quad (13)$$

(5) Static Friction of Friction Ring

Similarly, when the intermediary transfer belt 606 is being returned to its normal position against the deviatory force P, the friction which the intermediary transfer belt 606 receives from the friction ring 3a functions as resistive force F5. Therefore.

$$F_5 = \mu_S \int_0^{\theta_s} T_1 e^{-\mu_r \theta} d\theta \cos\phi \quad (14)$$
$$= \frac{\mu_s}{\mu_r} T_1(1 - e^{-\mu_r \theta_s})\cos\phi$$

Here, μr stands for the coefficient of friction of drive roller 604. In this embodiment, in order to prevent the electrostatic load in the primary transfer station, and/or contact load from the belt cleaning apparatus 85, from causing slip between the drive roller 604 and intermediary transfer belt 606, the belt centering mechanism is designed so that the coefficient of friction pr the drive roller 604 is in a range of 1.5-2.0 (μr=1.5-2.0).

(6) Counter Deviatory force P' to be Generated by Steering Roller

In the case of a belt centering system equipped with a steering roller, in order to cancel the angular deviation, the steering roller is intentionally steered at a certain angle to generate counter deviatory force P', which counters the deviatory force P.

<Belt Centering Mode Based on Tapering, and Belt Centering Mode Based on Steering Roller>

Summarizing in consideration of the directions of the forces in (1)-(6), the total amount Q of belt centering (returning) force can be obtained. The requirement for the belt centering (returning) force Q for automatically centering the intermediary transfer belt 606 is:

$$Q = F_1 F_2 + F_3 - F_4 - F_5 + P' > P \quad (15)$$

In other words.

$$P\sin\phi + \mu_s P\cos\phi + \theta_s E\frac{\Delta y}{r}\tan\phi(\sin\phi + \mu_s\cos\phi) - \quad (15')$$
$$\mu_{STR} N - \frac{\mu_s}{\mu_r} T_1(1 - e^{-\mu_r \theta_s})\cos\phi + P' > P$$

In other words, Mathematical Formula (15') means that as the amount Q of the total of the forces (1)-(6) exceeds the deviatory force P, the intermediary transfer belt 606 becomes automatically centered.

In comparison, in the case of a friction ring 3b, shown in FIG. 3(b), which is not tapered, the first to third terms in Formula (15'), which are related to the angle φ of the "taper" of the friction ring 3a, is zero. Therefore, the entirety of the force for overcoming the deviatory force P has to be provided by the counter deviatory force P'. In other words, the automatic belt centering system has to rely more on the angle of the steering roller, and therefore, the belt attitude (in which the intermediary transfer belt 606 is suspended (stretched)), which is the primary cause of the color deviation in the primary direction, is substantially changed. In the present invention, therefore, the belt centering system is reduced in the dependency upon steering angle, by setting low the value for the coefficient of friction $\mu_S$ of the friction ring $3a$, and also, utilizing the first to third items (F1-F3) related to the tapering angle $\phi$, as shown in Formula (15').

The greatest characteristic realized by the above described settings is that in the area where the deviatory force P is small, the deviation is dealt with only by the first to third items (F1-F3) in Formula (15'), which are related to the tapering angle cp. That is, the correction (centering) is made even if the steering roller 1 does not tilt. Further, as the deviatory force P exceeds a certain value (limit value, the counter deviatory force P' is also used. That is, the steering roller 1 is tilted to make the correction (centering). In other words, the greatest characteristic is that the automatic centering mode has two stages.

To describe this characteristic from the viewpoint of the deviation amount $\Delta y$, while the deviation amount $\Delta y$ is in a range in which the difference between the width of contact between one of the friction rings $3a$ and the intermediary transfer belt 606, and the width of contact between the other friction ring $3a$ and the intermediary transfer belt 606, is no larger than a preset value $\Delta wc$, the intermediary transfer belt 606 is centered without using the steering roller angle. Then, as a relatively large deviation amount $\Delta y$ is inputted, that is, as the difference between the width of contact between one of the friction rings $3a$ and the intermediary transfer belt 606, and the width of contact between the other friction ring $3a$ and the intermediary transfer belt 606, becomes larger than the preset value $\Delta wc$, the automatic belt centering system is switched to the mode in which the steering roller (angle) is used.

Figure 14:
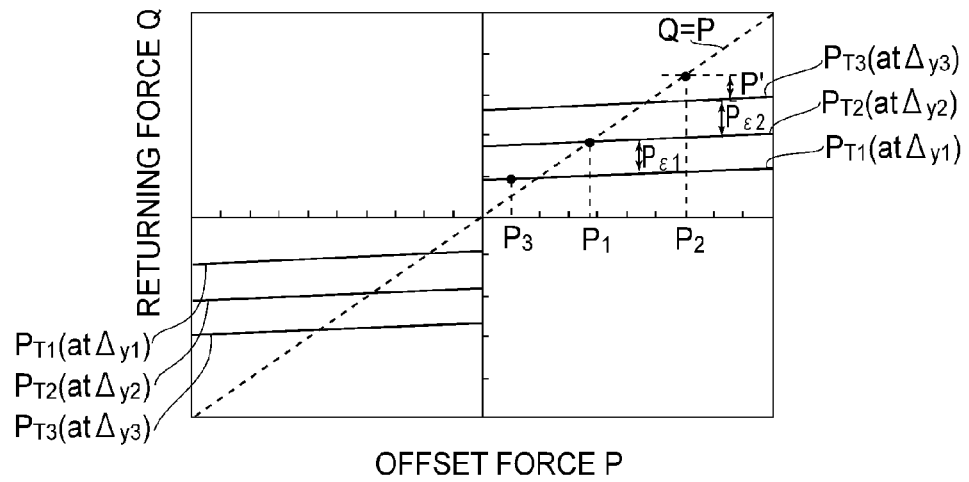
FIG. 14 shows a graph in which the relation between the offsetting force P and the belt return force Q is shown.

Next, referring to FIGS. 14 and 18, the automatic belt centering mode with two stages, which is the primary characteristic of the present invention, will be described in detail. FIG. 14 is a graph, the abscissa and ordinate of which represent the deviatory force P and belt returning (centering) force Q, respectively. The dotted line in FIG. 4 is a straight line, where Q=P. That is, the dotted straight line (Q=P) is the border line between where the automatic centering is possible and where the automatic centering is not possible. This means that if the belt returning (centering) force Q is above the dotted line, the belt can be automatically centered. PT1, PT2, and PT3 in the graph represent the total of the first to fifth items in Formula (15'). As will be evident also from Formula (15'), they are functions of the deviatory force P. As the deviatory force P switches between positiveness and negativeness (that is, direction of belt deviation), they discontinuously change. PT1, PT2, and PT3 correspond to belt deviation amounts $\Delta y1$, $\Delta y2$, and $\Delta y3$ ($\Delta y1 < \Delta y2 < \Delta y3$). In other words, they are the functions of the deviation amount $\Delta y$, as will be evident also from Formula (15').

In this embodiment, each of the two friction rings $3a$ is tapered at angle $\phi$, and is made relatively low ($\mu s \approx 0.3$) in the coefficient of friction $\mu s$ of the peripheral surface of the friction ring $3a$, so that the difference between the contact width between one of the friction ring $3a$ and the intermediary transfer belt 606, and the contact width between the other friction ring $3a$ and the intermediary transfer belt 606, will become large enough to generate steering torque only when the amount of deviation reaches or exceeds the amount $\Delta y3$. The coefficient of friction $\mu s$ of the peripheral surface of the friction ring $3a$ is greater than that of the peripheral surface of the follower roller 2.

Figure 18:
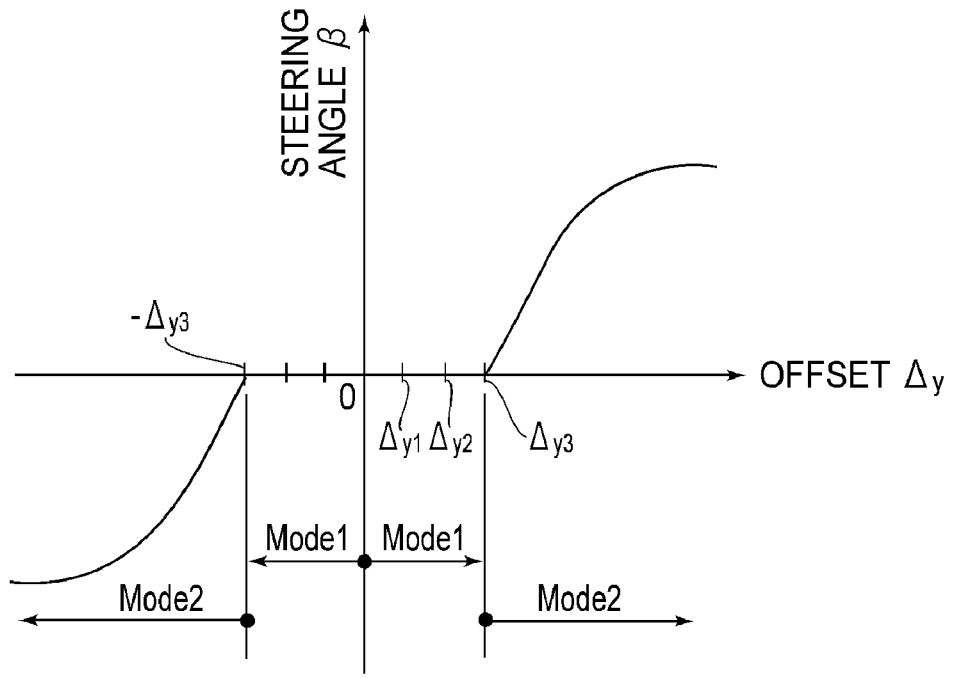
FIG. 18 shows a graph illustrating two automatic alignment modes according to the present invention.

FIG. 18 is a graph, the abscissa of which represents the deviation amount $\Delta y$, and the ordinate of which represents the steering angle $\beta$. It shows the changes in the amount of steering angle $\beta$, which correspond to deviation amounts $\Delta y1$, $\Delta y2$, and $\Delta y3$, respectively.

Here, it is assumed that the belt supporting rollers of the intermediary transfer belt unit 500 are misaligned, and/or the drive roller 604 is uneven in external diameter, and therefore, the belt deviation occurred, and the amount of the deviatory force P is P1 shown in FIG. 14. If the belt deviation amount is $\Delta y1$, PT1 is below the dotted line, and therefore, counter deviation force Q is insufficient. Therefore, in order to make counter deviation force Q sufficient, the belt deviation amount is increased to amount $\Delta y2$ to compensate for insufficient amount P$\epsilon$1. In a case where the amount of the deviatory force P is P1, which is relatively small, it is unnecessary to generate the steering torque. That is, the belt returning (centering) force caused by the tapering (angle $\phi$) of the friction ring $3a$ is sufficient to automatically center the intermediary transfer belt 606.

This corresponds to Mode 1, in FIG. 18, which is the first operational stage of the belt centering system in accordance with the present invention.

Next, assuming that a belt deviation similar to the above described one occurs, and the amount of deviatory force P is P2, shown in FIG. 14. If the belt deviation amount $\Delta y$ is greater than the above mentioned amount $\Delta y2$, PT2 is below the dotted line, and therefore, the returning (centering) force Q is insufficient. Therefore, it is attempted to compensate for the insufficient amount of the returning force Q by increasing the amount of belt deviation. While the belt deviation amount is increased, it reaches the belt deviation amount $\Delta y3$. Therefore, although the belt returning force Q, which is caused by the tapering (angle $\phi$) of the friction ring $3a$, can be increased only to P$\epsilon$2, it becomes possible to obtain the counter deviatory force P', which involves the steering of the steering roller, instead of the tapering.

This corresponds to Mode 2, in FIG. 18, which is the second stage of the belt centering operation in accordance with the present invention. The amount of the belt deviation which occurs while the belt is circularly driven under the normal condition is no more than $\Delta y3$. Therefore, in the normal condition, the belt deviation can be dealt with in the belt centering operation in the first mode. However, in a case where the deviation amount exceeds $\Delta y3$, it is assumed to be such an operation in which changes in load are large, for example, an operation in which cardboard or the like is conveyed as recording medium, or immediately after an intermediary transfer belt replacement.

The belt centering first mode (stage), which relies on the tapering (angle $\phi$) of the friction ring $3a$, is not a mode (stage) that truly eliminates the deviatory force P. However, the belt centering second mode (stage) is a mode that truly eliminates the difference in angle $\gamma$ which is the cause of the generation of the deviatory force P. In other words, the occurrence of steering is what compensates for the distortion of the intermediary transfer belt 606. Thus, the occurrence of steering reduces the deviatory force P to P3 shown in FIG. 14. As the deviatory force P reduces to P3, the amount of deviation becomes smaller than $\Delta y1$. Then, once the amount of deviation becomes smaller than $\Delta y1$, the deviation is gradually and automatically eliminated by the belt centering effect of the tapering (angle $\phi$) of the friction ring $3a$, and therefore, the normal operational condition is restored.

<Setting of Coefficient of Friction $\mu s$>

The present invention reduces the steering angle by providing the belt centering automatic system with two belt centering modes (stages), as described above. What is important here is to what value the coefficient of friction μs of the friction ring 3a is set.

More concretely, it is to set the coefficient of the friction μs of the friction ring 3a to a relatively low value. In this embodiment, it is set to roughly 0.3 (μs≈0.3), and the angle φ of the tapering is set to roughly 8° (φ≈8°)

However, the coefficient of friction of the peripheral surface of the friction ring 3a is made larger than that of the peripheral surface of the follower roller 2. Incidentally, as for the material for the friction ring 3a, a resinous substance such as polyacetal (POM) which is slidable is used. Further, in consideration of electrostatic problems attributable to the electrical charge resulting from the friction between the friction ring 3a and intermediary transfer belt 606, the friction ring 3a is given electrical conductivity. Next, the reason why the friction ring 3a has to be tapered (at angle φ), and also, why the friction ring 3a has to be given a relatively smaller amount of friction (certain amount of friction) will be described in detail.

It was already described that the amount of the steering force generated to automatically centering the intermediary transfer belt 606 by using the unbalance between the amount of friction between the friction ring 3a located at one end of the steering roller 1 and intermediary transfer belt 606, and the amount of friction between the friction ring 3a located at the other end of the steering roller 1 and the intermediary transfer belt 606, can be obtained by multiplying Equation (6) with the amount of difference between the width of contact between the friction ring 3a at one of the lengthwise ends of the steering roller 1 and intermediary transfer belt 606, and the width of contact between the friction ring 3a at other end and the intermediary transfer belt 606. In the case of a belt centering automatic system, such as the one in this embodiment, which uses the unbalance in the friction, along with the tapering of the friction ring 3a, the amount of steering force FSTR can be obtained by replacing the amount of belt tension T1 in Equation (6) with a belt tension T, and taking into consideration the amount of difference in width of contact between the two edges of the intermediary transfer belt 606.

$$T = T_1 + \frac{E}{r}\tan\phi \tag{16}$$

Then, the steering force FSTR can be expressed as follows:

$$F_{STR} = 2\Delta y \mu_s \left(T_1 + \frac{E}{r}\tan\phi\right)\int_0^{\theta_S} e^{-\mu_r \theta}\sin(\theta + \alpha)d\theta \tag{17}$$

Figure 11:
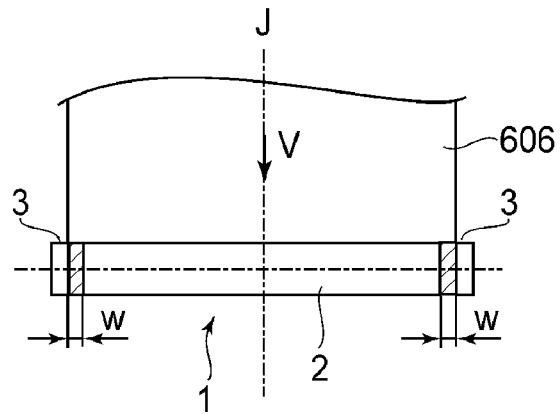
FIG. 11 illustrates the riding width of the belt on a sliding ring.

The reason why the difference between the width of contact between the friction ring 3a at one of the lengthwise ends of the steering roller 1 and the intermediary transfer belt 606, and the width of contact between the friction ring 3a at the other end of the steering roller 1 and the intermediary transfer belt 606, becomes 2Δy is that the width of the intermediary transfer belt 606 is greater than that of the follower roller 2, and is less than the width of the steering roller 1 (combination of follower roller 2 and two friction rings 3a), as shown in FIG. 11. Regarding this relationship, when the intermediary transfer belt 606 is in the idealistic state in terms of position (normal), the width of contact between the friction ring 3a and intermediary transfer belt 606 is w (hatched portion in drawing) at both ends of the steering roller 1. Thus, if the intermediary transfer belt 606 deviates by Δy in its width direction, the difference between the width of contact between the friction ring 3a and intermediary transfer belt 606 at one of the lengthwise ends of the steering roller 1, and that at the other lengthwise end of the steering roller 1, becomes 2Δy, as shown in FIG. 11. That is, even if the belt deviation occurs, the intermediary transfer belt 606 always remains in contact with one of the friction rings 3a, and therefore, rubs the friction ring 3a. Therefore, the unbalance in friction between one end of the steering roller 1 and the other can be always detected. Therefore, sudden changes do not occur to the steering angle β.

It was described referring to FIG. 14 that if a relatively large deviatory force P2, that is, a deviatory force P which is too large for the tapering (angle φ) of the friction ring 3a to deal with, occurs, compensation is made for the insufficiency by generating the counter deviatory force P' by rotationally moving the steering roller 1. Basically, the counter deviatory force P' is generated by changing the difference in angle between the moving direction of the intermediary transfer belt 606 and the attitudinal direction of the intermediary transfer belt 606. Thus, steering angle β1, which is equivalent to the amount of change made to this difference in angle between the moving direction of the intermediary transfer belt 606, can be simply determined.

Figure 15:
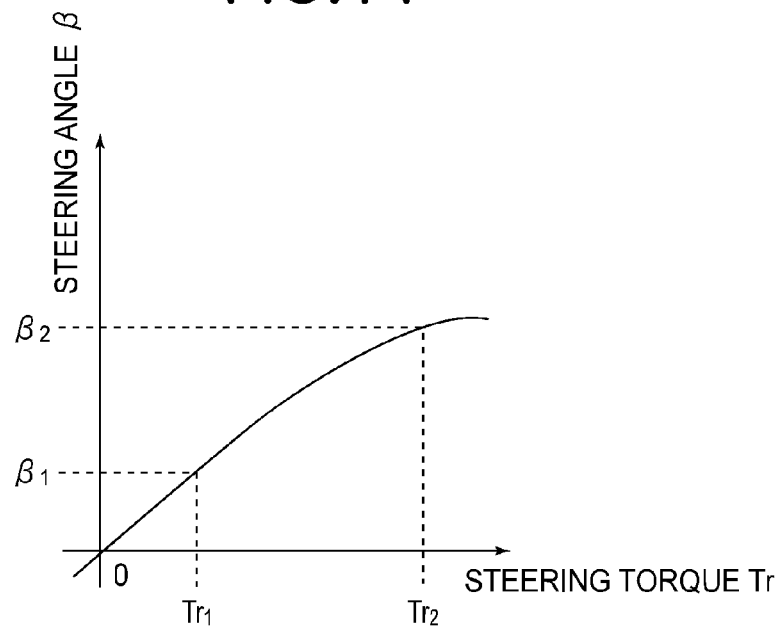
FIG. 15 shows a graph in which the relation between a steering torque Tr and the steering angle occurred β is shown.

FIG. 15 is a graph which shows the relationship between the amount of the steering torque Tr and the steering angle β. Basically, as the deviation amount Δy increases, the difference in width of contact between the friction ring 3a and intermediary transfer belt 606 at one end of the steering roller 1, and that at the other end of the steering roller 1, increases, and therefore, the steering torque Tr increases, which in turn increases the steering angle β. However, as the steering angle β is increased, the force which the intermediary transfer belt 606 generates to resist its twisting, also increases. Therefore, there is a limit to the size of the steering angle β. Here, the amount of the steering torque Tr can be expressed by the following equation.

$$Tr = F_{STR}L \tag{18}$$
$$= 2\Delta y L \mu_s \left(T_1 + \frac{E}{r}\tan\phi\right)$$
$$\int_0^{\theta_S} e^{-\mu_r \theta}\sin(\theta + \alpha)d\theta$$

A letter L in the equation is the radius of the rotational movement of the steering roller 1, and stands for the distance shown in FIG. 10(b).

Referring to FIG. 15, the amount of steering torque Tr necessary to generate a steering angle β1 is Tr1, which can be calculated using Equation (18). Equation (18) has multiple parameters that affect the amount of the steering torque Tr. In reality, however, in many cases, the parameters other than the coefficient of friction μs inevitably settle to certain values because of the required intermediary transfer belt driving performance, transfer performance, etc., of which the intermediary transfer belt unit is required. Thus, the parameters, the value of which is to be set for the automatic centering of the intermediary transfer belt 606, are the angle φ of the tapering of the friction ring 3a, and the coefficient of friction μs. In the case of this embodiment, in which the angle φ of the tapering of the friction ring 3a is eight degrees (φ=8°), the coefficient of friction μs, which is for generating the steering torque Tr1 need to be roughly 0.3 (μs≈0.3). If the friction ring 3a is made of such a material as silicon rubber that is high in coefficient of friction ($\mu$s=1.0), the steering torque Tr2, the amount of which is determined by Equation (18), becomes larger than the steering torque Tr1, as shown in FIG. 15, and the steering angle $\beta$2, which is determined by the steering torque Tr1, becomes greater than the steering angle $\beta$1. In other words, the steering angle $\beta$2, which is greater than necessary, brings forth a wasteful amount of change to the attitude of the intermediary transfer belt 606. Thus, the overshoots occur during the automatic centering of the intermediary transfer belt 606, which results in the deviation in the dot position in the primary scan direction. That is, all that is necessary is not that the steering torque Tr1 which provides the steering angle $\beta$1 is included. Unless the coefficient of friction $\mu$s is set in consideration of the effects of the excessive amount ($\beta$2−$\beta$1) of steering angle $\beta$ generated by the excessive amount of torque (Tr2−Tr1), the effects (which reduces changes which occur to belt attitude with elapse of time) of the belt centering automatic system having two modes (stages), which uses the tapered (at angle $\phi$) friction ring 3a, cannot be obtained. Incidentally, regarding how large or small the coefficient of friction $\mu$s, according to the basic theory of the automatic centering of belt, the larger the coefficient of friction $\mu$s, the greater the steering torque. Therefore, if solving the belt deviation problem is the only object as in the past, a substance, such as rubber, the coefficient of friction $\mu$s of which is in a range of 1.0-1.5 ($\mu$s=1.0-1.5) is to be chosen as the material for the friction ring 3a. This range is defined as the high range for the coefficient of friction $\mu$s.

On the other hand, the object of the present invention is to solve two problems, which are the belt deviation and the image deviation in the primary scan direction. It was already explained that the above-described automatic centering system having two stages (modes) is effective. The friction ring 3a for achieving this object is structured so that it is tapered at angle $\phi$, and its peripheral surface is made frictional (coefficient of friction $\mu$s). A value 0.3 to which the coefficient of friction $\mu$s is set to achieve the object can be defined as being clearly low compared to that in the past.

<Coefficient of Friction $\mu$STR and Belt Material>

Up to this point, the automatic belt centering mode, which is carried out in two stages, and is one of the characteristic features of the present invention, has been descried while emphasizing the importance of the parameters which determine the characteristics of the friction ring 3a. However, the requirements for improving the belt centering automatic system are present also for the coefficient of friction $\mu$STR of the follower roller 2 and the material of the intermediary transfer belt 606.

In Equation (15'), coefficient of friction $\mu$STR is related to the resistive force which works when the intermediary transfer belt 606 is restored in position. Coefficient of friction $\mu$STR itself is not one of the parameters which is related to the driving performance and transfer performance of the intermediary transfer belt unit. Therefore, it can be set from the standpoint of the automatic centering of the belt. Further, among the first to third items in Equation (15'), which are related to the taper angle $\phi$, the third item includes the coefficient of tensional elasticity, being therefore highest in terms of the contribution to the belt returning (centering) force Q. It is evident therefore that the counter deviatory force P', which has to be generated by rotationally moving the steering roller 1, can be kept small by making the third item as large as possible, and the fourth item as small as possible.

In this embodiment, therefore, aluminum is used as the material for the follower roller 2 to provide the peripheral surface of the follower roller 2 with a coefficient of friction of roughly 0.1 ($\mu$STR$\approx$0.1), which is smaller than the coefficient of friction $\mu$S of the friction ring 3a ($\mu$s$\approx$0.3).

The intermediary transfer belt 606 is a resinous belt, the substrate layer of which is polyimide, and its coefficient of tensional elasticity E is approximately 18,000 N/cm$^2$. Thus, the large tensional stress, which occurs in a substance which is large in coefficient of tensional elasticity E and is unlikely to stretch, can be effectively converted into belt returning (centering) force by making the follower roller 2 smaller in its coefficient of friction $\mu$STR.

This continuously eliminates the warping which occurs to the intermediary transfer belt 606. Therefore, it does not occur that the intermediary transfer belt 606 is continuously driven while remaining subjected to a harmful amount of load.

Therefore, not only is it possible to realize an automatic belt centering system which is significantly smaller in the counter deviatory force P', and also, smaller in attitude change of the steering roller 1, than a conventional system, but also, to prevent the breaking of the intermediary transfer belt 606, or the like problems. Incidentally, the material for the intermediary transfer belt 606 does not need to be limited to polyimide. That is, it may be a resinous material other than the polyimide, or a metallic material, as long as the material can provide an intermediary transfer belt, the substrate layer of which is formed of a material which is similar in coefficient of elasticity to polyimide and does not easily stretch. Further, the material of the follower roller 2 may be a material other than the one in this embodiment, as long as its coefficient of friction $\mu$STR is smaller than the coefficient of friction $\mu$s of the friction ring 3a.

Here, the method for measuring the coefficient of friction of the above described friction ring 3a, follower roller 2, drive roller 604, etc., will be described. In this embodiment, the coefficient of friction testing method for plastic film and sheet (JIS K7125) is used. More concretely, a sheet which makes up the inward surface of a belt, which in this embodiment is the polyimide sheet which makes up the inward surface of the intermediary transfer belt 606, is used as a test piece.

<Effects of Belt Centering Automatic System in Accordance with Present Invention>

Figure 13:
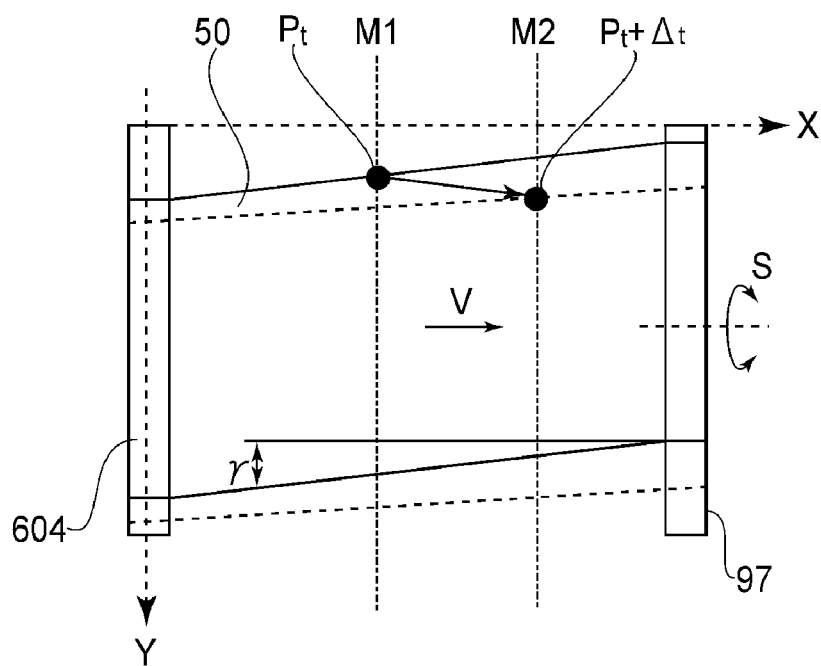
FIG. 13 is a top plan view (2) illustrating the relation between the belt offsetting and the main scanning position deviation.
Figure 17:
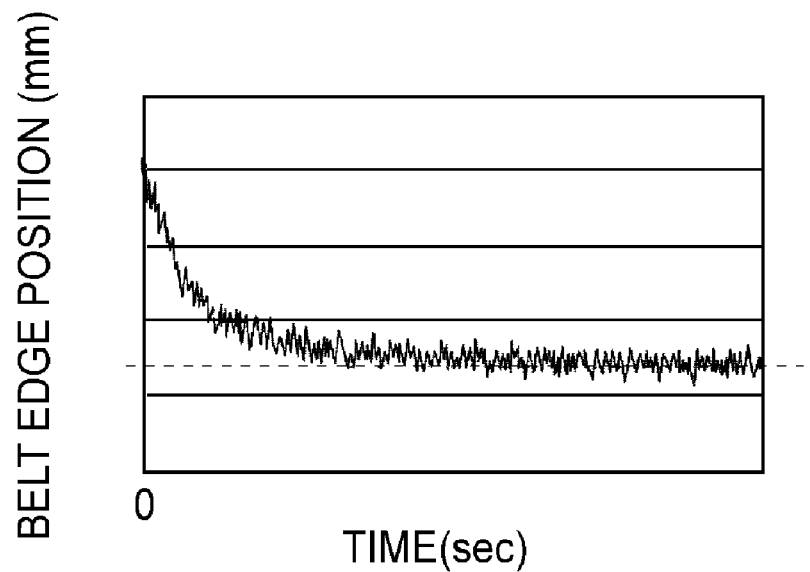
FIG. 17 shows a graph illustrating an effect by the belt automatic alignment according to the present invention.
Figure 17:
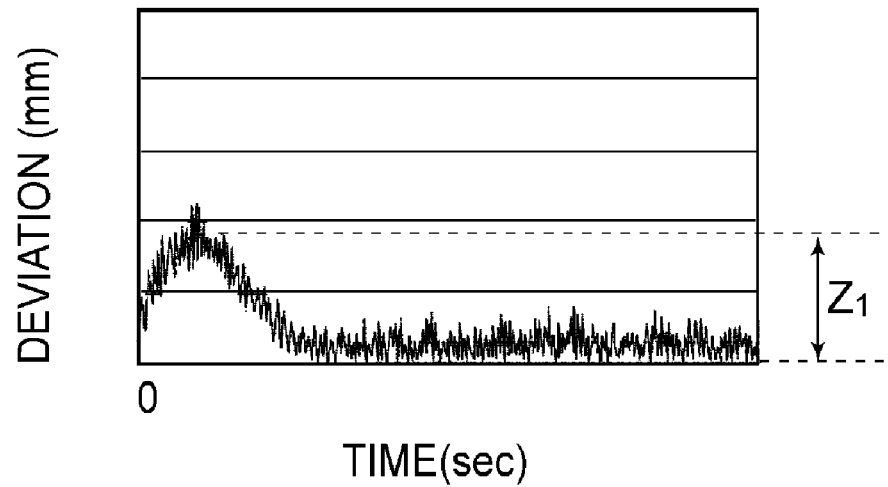

FIG. 17 shows the action of the above described belt centering automatic system in this embodiment. FIG. 17(a) is a graph which shows the progression of the response of the belt centering automatic system, which occurred when an external disturbance which caused the belt deviation occurred at t=0 (sec). FIG. 17(b) is a graph which shows the amount of difference between the data which were obtained at two belt edge detection positions M1 and M2 (FIGS. 12 and 13) located at different positions in terms of the belt movement direction. It shows the changes in the positional deviation, in terms of the primary scan direction, which occurred when the intermediary transfer belt 606 was automatically centered. As will be evident from FIG. 17(a), as the belt centering automatic system in this embodiment is used, the belt edge is returned to the normal position without overshooting. Thus, as will be evident from FIG. 17(b), it is possible to center the intermediary transfer belt 606 without conspicuous positional deviation in the primary scan direction, except for the positional deviation z1 in the primary scan direction, which is the effect of the external disturbance inputted at t=0 (sec). As will be evident from FIG. 17(a), by using the belt centering automatic system in this embodiment, the belt edge is returned to the normal position without involving the overshoot. As a result, as will be understood from FIG. 17(b), the intermediary transfer belt 606 can be centered without involving the conspicuous positional deviation in terms of the primary scan direction, except for the positional deviation z1 effected by the external disturbance inputted at t=0.

As described above, by using the present invention, the positional deviation of the intermediary transfer belt 606, which is likely to occur as the intermediary transfer belt 606 is circularly moved, can be automatically corrected using only the frictional unbalance, while using as small a steering angle possible, that is, while suppressing the changes of the suspension attitude of the belt, which occur with elapse of time. Therefore, it is possible to provide an intermediary transfer belt unit which is capable of solving not only the belt deviation problem, but also, the color deviation problem in terms of the primary scan direction. Further, the belt centering automatic unit in this embodiment is not a belt centering automatic unit that depends on only the coefficient of friction. Therefore, the friction ring can be molded of an inexpensive resinous substance. Therefore, the belt centering automatic unit in this embodiment is unlikely to be affected by the nonuniformity in the coefficient of friction, and also, is not easily affected by the changes which occur with elapse of time. With the employment of an intermediary transfer belt unit, such as the one in this embodiment, it is possible to provide an image forming apparatus which is very robust, inexpensive, and superior in image quality.

Incidentally, the image forming apparatus in this embodiment was a color image forming apparatus (FIG. 6). However, the present invention is also applicable to a monochromatic image forming apparatus which yields only black images. In a case where the present invention is applied to a monochromatic image forming apparatus, the positional deviation in the primary scan direction is not color deviation. Instead, it is the decline in the registration accuracy in terms of the primary scan direction, which is attributable to the progressive deterioration of the lateral edges of an image. Further, the parameter setting for the friction ring 3*a* in this embodiment is nothing but an example. In other words, the values for the tapering angle φ and coefficient of friction for the friction ring 3*a* may be different from those given in this embodiment, as long as the automatic belt centering mode having two stages, which is the primary characteristic feature of the present invention, holds.

[Embodiment 2]

Figure 7:
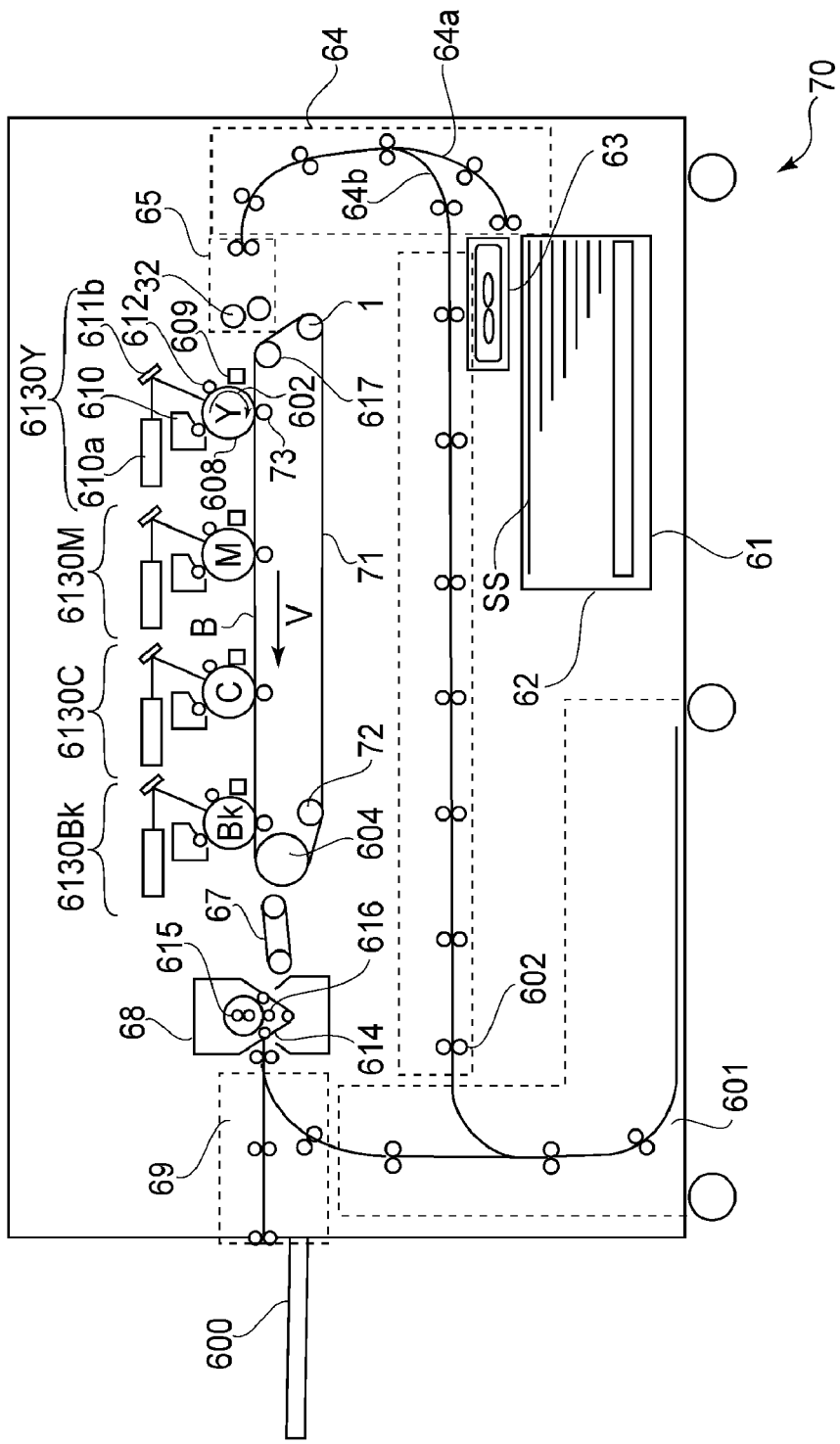
FIG. 7 is a sectional view of an image forming apparatus of a direct transfer type.

In addition to the intermediary transfer belt in the above described first preferred embodiment, the transfer belt 71, with which an image forming apparatus 70, shown in FIG. 7, is provided can be listed as another belt involved in image formation. The image forming apparatus 70 shown in FIG. 7 is basically the same in recording medium feeding process and recording medium conveyance process as the image forming apparatus 60 shown in FIG. 6. Therefore, the image forming apparatus 70 will be described only about its image formation process which is different from that of the image forming apparatus 60.

The image forming apparatus 70 in this embodiment has: an image forming portion 613Y which forms an image with the use of yellow (Y) toner; an image forming portion 613M which forms an image with the use of magenta (M) toner; an image forming portion 613C which forms an image with the use of cyan (C) toner; and an image forming portion 613BK which forms an image with the use of black (BK) toner. The image forming portions 613Y, 613M, 613C, and 613BK are the same in structure, although they are different in toner color. Therefore, an image forming portion 613Y is described as their representative. Incidentally, the image forming portions 613 are the same in structure as those the image forming apparatus in the above described first preferred embodiment.

The image forming portion 613Y, which is a toner image forming means, is made up of: a photosensitive member 608, which is an image bearing member; a charging device 612 for charging the photosensitive member 608; an exposing apparatus 611*a*; a developing apparatus 607, and a photosensitive member cleaner 609. The photosensitive member 608 is rotated in the direction indicated by the arrow mark m2 in the drawing. As the photosensitive member 608 is rotated, its peripheral surface is uniformly charged by the charging device 612. The exposing apparatus 611*a* is driven by the inputted signals of image formation information, and the charged portion of the photosensitive member 608 is exposed to the beam of light projected upon the charged portion through a diffractive member 611*b*. By this exposure, an electrostatic latent image is formed on the photosensitive member 608. The electrostatic latent image on the photosensitive member 608 is developed by the developing apparatus 610. As a result, a visible image (which hereafter may be referred to as toner image) is effected on the photosensitive member 608.

Meanwhile, a recording medium sheet S is sent into the main assembly of the image forming apparatus in synchronism with the progression of the yellow (Y) image formation process, which is positioned most upstream in terms of the rotational direction of the transfer belt 71. Then, the recording medium sheet S is held electrostatically adhered to the portion of the transfer belt 71, which is in the image formation area. While the recording medium sheet S is conveyed by the transfer belt 71, remaining adhered to the sheet S, a toner image is transferred onto the recording medium sheet S. The image formation process and transfer process, which are similar to those carried out in the yellow image forming portion 613Y, are also carried out in sequence in the image forming portions 613M, 613C, and 613BK, which are on the downstream side of the image forming portion 613Y, with such a timing that the toner images formed in the downstream image forming portions are transferred in layers onto the recording medium sheet S, which is being conveyed by the transfer belt 71. As a result, a full-color toner image is effected on the recording medium sheet S. Then, the recording medium sheet S is separated from the portion of the transfer belt 71, which is in contact with the drive roller 604, by the curvature of the drive roller 604 (static electricity is removed as necessary). Then, the recording medium sheet S is conveyed to a fixing apparatus 68, which is on the downstream side in terms of the recording medium conveyance direction, through a pre-fixation conveyance portion 67. Incidentally, the transfer residual toner, that is, the toner remaining on the photosensitive member 608 after the toner image transfer, is recovered by the photosensitive member cleaner 609, to prepare the photosensitive member 609 for the next image formation cycle. In the case of the image forming apparatus in this embodiment, there are four image forming stations 613, that is, the image forming portions Y, M, C, and BK. However, the number of colors, and the order in which the image forming portions 613 are arranged, do not need to be limited to the above described ones.

Next, the transfer belt unit, which is the unit for circularly moving the transfer belt 71, will be described about its structure. The transfer belt 71 is a member in the form of an endless belt, which is held stretched by a drive roller 604, a steering roller 1, a pair of auxiliary rollers 72 and 617, and is circularly moved in the direction indicated by an arrow mark V in the drawing. The function of providing the transfer belt 71 with a preset amount of tension is also provided, along with the function of driving the transfer belt 71, by the steering roller 1. The automatic belt centering mechanism is the same in structure as the automatic belt centering mechanism in the first preferred embodiment described with reference to FIGS. 1 and 2. Basically, the friction ring portions 3 in this embodiment are the same as those in the first preferred embodiment, which depend on both the tapering (at angle ϕ) and steering roller 1, as shown in FIGS. 3(a) and 4.

Figure 16:
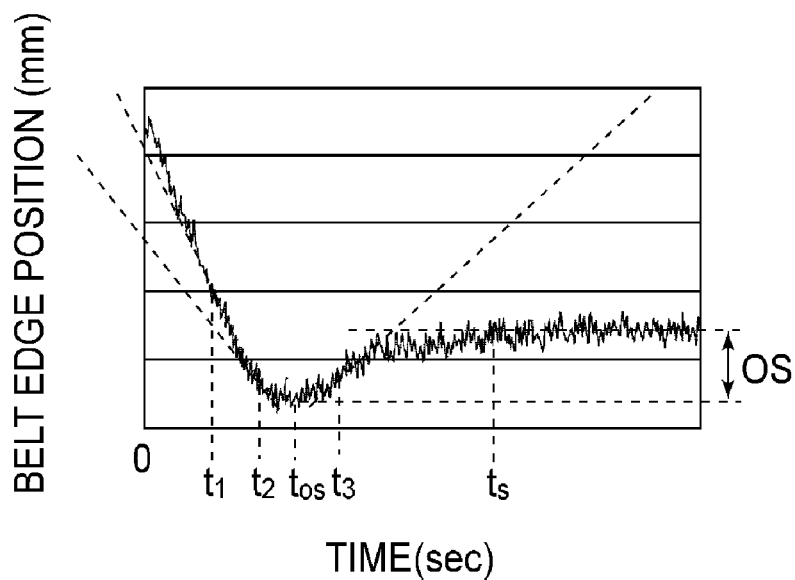
FIG. 16 shows a graph illustrating a problem in the conventional automatic belt alignment.
Figure 16:
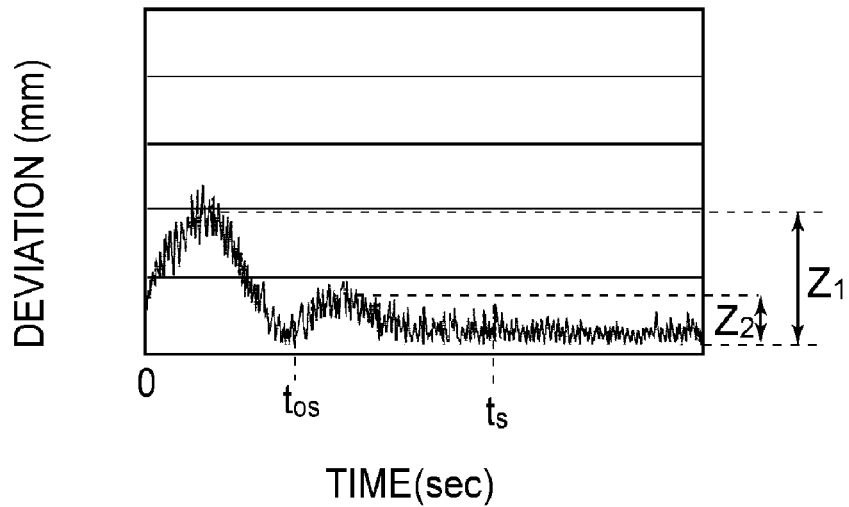

In the case of an image forming apparatus of the direct transfer type, such as the image forming apparatus 70 shown in FIG. 7, the change in the attitude in which the transfer belt 71 is held stretched, becomes the changes in the attitude of the recording medium sheet S on the transfer belt 71. Therefore, if the change in the steering roller angle, which is caused while the transfer belt 71 is automatically centered, is large, the overshoot, shown in FIG. 16, which occurs during the progression of centering of the transfer belt 71, and the positional deviation in the primary scan direction, which is attributable to the overshoot, occur. Therefore, not only the friction ring 3 is tapered (at angle ϕ), but also, is made relatively small in coefficient of friction μs, and the automatic belt centering operation which is carried out in two stages, which is shown in FIGS. 14 and 18, is carried out as in the case of the first preferred embodiment. Basically, the coefficient of friction μSTR of the follower roller 2, coefficient of tensional elasticity E in this embodiment are made similar to those in the first preferred embodiment. More concretely, the friction rings 3 are formed of electrically conductive polyacetal (POM), and are eight degrees in the angle ϕ of the tapering (ϕ=8°), and 0.3 in the coefficient of friction (μs=0.3). The follower roller 2 is formed of aluminum, and is 0.1 in coefficient of friction (μSTR=0.1). The transfer belt 71 is formed of polyimide, and its coefficient of tensional elasticity E is 18,000 N/cm² (E=18, 000 N/cm²).

Thus, when the deviatory force P is so small that the deviation amount Δy does not reach the deviation amount Δy3, which is large enough for the steering roller 1 to be steered (at angle β), the transfer belt 71 can be automatically centered by the tapering (at angle ϕ) of the friction ring 3 alone. When the deviatory force P is large enough for the deviation amount Δy to be Δy3, the transfer belt 71 can be automatically centered by utilizing the counter deviatory force P', which is generated by rotationally moving the steering roller 1, and therefore, can be automatically centered by rotationally moving the steering roller 1 at a relatively small steering angle β. Therefore, the transfer belt 71 can be centered without the overshooting, such as that shown in FIG. 17, and therefore, it is possible to minimize the image deviation in the primary scan direction, which occurs when the transfer belt 71 is automatically centered. In other words, not only can this preferred embodiment solve the belt deviation problem, but also, can improve an image forming apparatus in terms of the color deviation in the primary scan direction. Ultimately, the employment of this transfer belt unit makes it possible to provide an image forming apparatus, which is inexpensive, but, is high in image quality.

Incidentally, the parameter setting for the friction ring 3a in this embodiment is nothing but an example. That is, the value for the angle ϕ of the tapering of the friction ring 3, and the value for the coefficient of friction μs, may be other values than those in this embodiment, as long as the their relationship allows the image forming apparatus in this embodiment to be operated in the automatic belt centering two-stage mode (FIG. 18). Further, the image forming portion 613, shown in FIG. 7, uses an electrophotographic image forming method. However, the present invention is also applicable to an image forming apparatus, the image forming portions of which uses inkjet recording method, as long as the apparatus uses the transfer belt 71.

[Embodiment 3]

Figure 8:
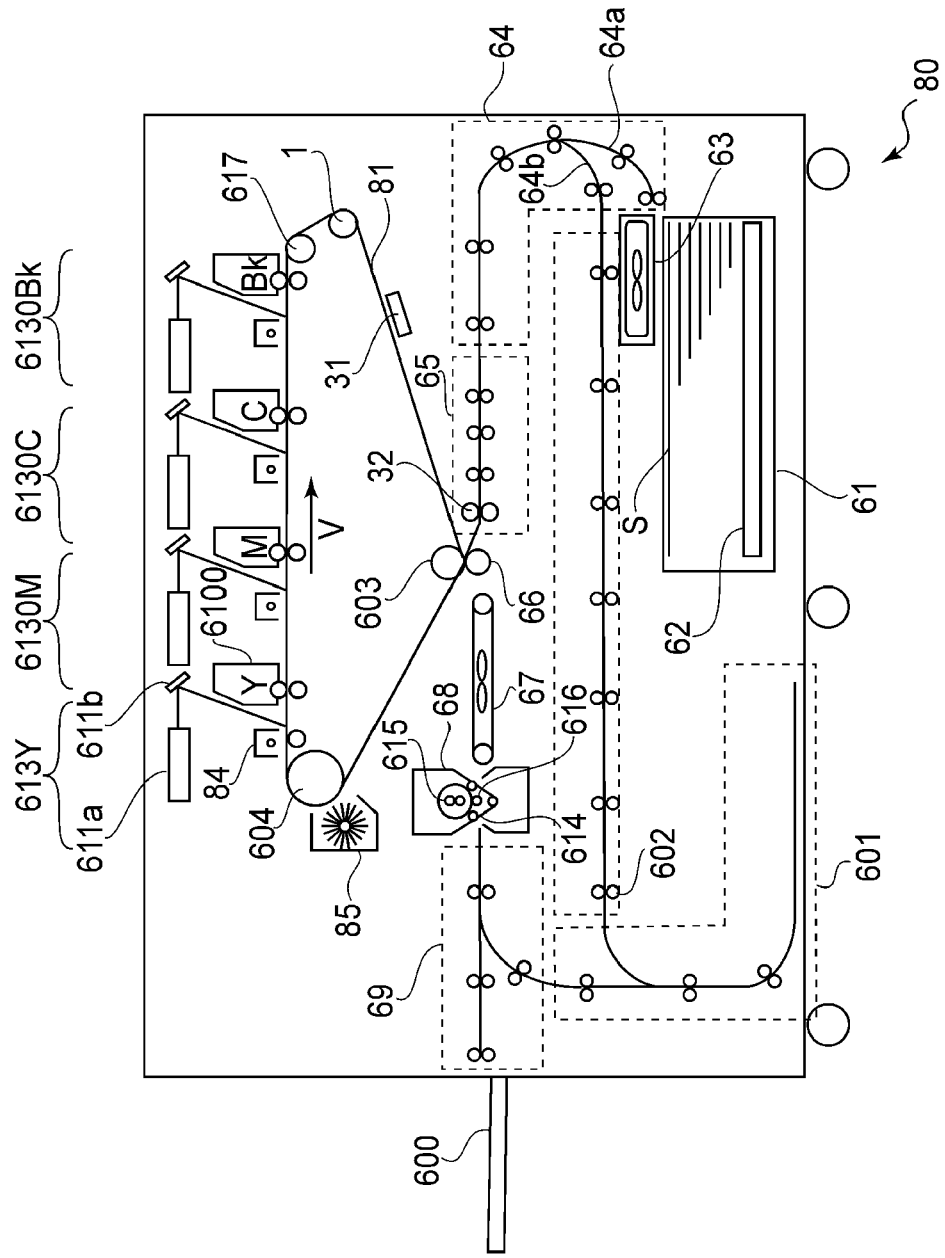
FIG. 8 is a sectional view of an image forming apparatus of a photosensitive belt type.
Figure 9:
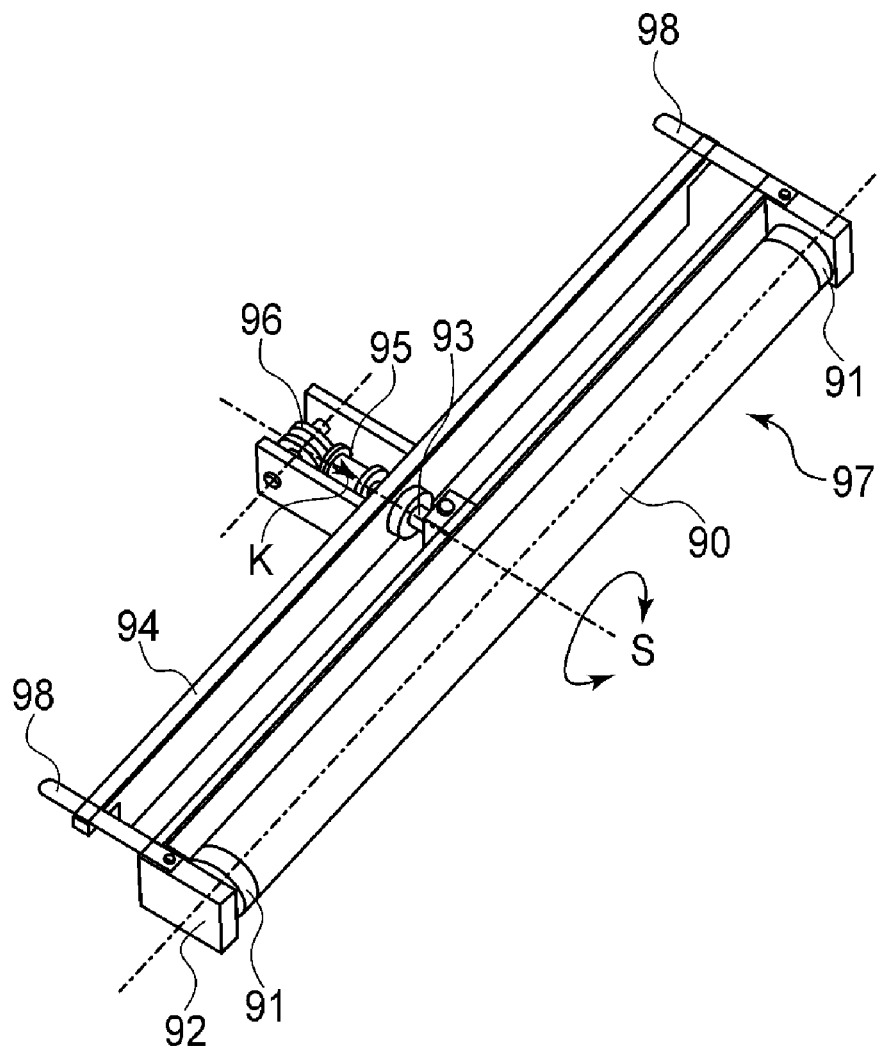
FIG. 9 is a perspective view illustrating a belt automatic alignment according to a conventional example.

Further, as one of the components involved in image formation, an image formation belt 81, with which the image forming apparatus 80, shown in FIG. 8, is equipped, can be listed. Basically, The image forming apparatus 80 shown in FIG. 8 is basically the same in recording medium feeding process and recording medium conveyance process as the image forming apparatus 60 shown in FIG. 6. Therefore, the image forming apparatus 80 will be described only about its image formation process which is different from that of the image forming apparatus 60.

The image forming apparatus 80 in this embodiment has: an image forming portion 6130Y which uses yellow (Y) toner for development; an image forming portion 6130M which magenta (M) toner for development; an image forming portion 6130C which uses cyan (C) toner for development; and an image forming portion 6130BK which uses black (BK) toner for development. The image forming portions 6130Y, 6130M, 6130C, and 6130BK are the same in structure, although they are different in toner color. Therefore, an image forming portion 6130Y is described as their representative. The image forming portion 6130Y is primarily made up of a photosensitive belt 81, a charging apparatus 84, an exposing apparatus 611a; a developing apparatus 6100, etc. The components in this embodiment which are the same in referential code as those in the first preferred embodiment are the same in structure as those in the first preferred embodiment.

The photosensitive belt 81 is an endless belt, the surface layer of which is a photosensitive layer. It is held stretched by a drive roller 604, a steering roller 1, an inward transfer roller 82, a pair of auxiliary rollers 72 and 617, and is circularly moved in the direction indicated by an arrow mark V in the drawing. The number of the photosensitive belt supporting rollers does not need to be limited to that in this embodiment. As the photosensitive belt 81 is rotated, its outward surface is uniformly charged by the charging device 84. Then, the charged portion of the photosensitive belt 81 is scanned by the exposing apparatus 611a. As a result, an electrostatic latent image is formed on the photosensitive belt 81. The exposing apparatus 611a is driven by the inputted signals of image formation information, and projects a beam of light across the charged portion of the photosensitive belt 81 through a diffractive member 611b. The electrostatic latent image on the photosensitive belt 81 is developed by the developing apparatus 6100, with the use of toner. The above described sequence of the image formation process are sequentially carried out in the image forming portions Y, M, C, and BK, starting from the image forming portion Y, which is the most upstream one, while being controlled with such a timing that the toner images formed in the downstream image forming portions are placed in layers on the photosensitive belt 81. As a result, a full-color toner image is effected on the photosensitive belt 81, and conveyed to the transfer nip, which is formed by an inward transfer roller 82 and an outward transfer roller 83. The process carried out in the transfer nip to transfer the full-color toner image from the photosensitive belt 81 onto the recording medium sheet S, the timing control for the process, etc., are basically the same as those for the intermediary transfer method described with reference to FIG. 6. Incidentally, the transfer residual toner, that is, the toner remaining on the photosensitive belt 81 after the toner image transfer, is recovered by the belt cleaner 85, to prepare the photosensitive belt 81 for the next image formation cycle. In the case of the image forming apparatus in this embodiment, there are four image forming stations 6130, that is, the image forming portions Y, M, C, and BK. However, the number of colors, and the order in which the image forming portions 6130 are arranged, do not need to be limited to the above described ones.

Next, the structure of the unit which circularly moves the photosensitive belt 81 will be described. The photosensitive belt 81 is a member in the form of an endless belt, which is held stretched by a drive roller 604, a steering roller 1, and a pair of auxiliary rollers 72 and 617. It is circularly moved in the direction indicated by an arrow mark V in the drawing. The function of providing the photosensitive belt 81 with a preset amount of tension is also provided, along with the function of driving the photosensitive belt 81, by the steering roller 1.

The automatic belt centering mechanism in this embodiment is the same in structure as the automatic belt centering mechanism in the first preferred embodiment described with reference to FIGS. 1 and 2. The friction ring portions 3 in this embodiment are tapered at an angle of $\phi$ as those in the first preferred embodiment, as shown in FIGS. 3(a) and 4. Basically it is the same as that in the first preferred embodiment. In the case of an image forming apparatus of the photosensitive belt type, such as the image forming apparatus 80 shown in FIG. 8, if the change in the steering roller angle, which is caused while the photosensitive belt 81 is automatically centered, is large, the change in the attitude in which the photosensitive belt 81 is held stretched also becomes large, and therefore, the overshoot, shown in FIG. 16, which occurs while the photosensitive belt 81 is centered, and the positional deviation in the primary scan direction, which is attributable to the overshoot, occur. Therefore, not only the friction ring 3 is tapered (at angle $\phi$), but also, is made relatively small in coefficient of friction $\mu s$, so that the belt centering automatic operation is carried out in two stages, which is shown in FIGS. 14 and 18, as in the case of the first preferred embodiment.

Basically, the coefficient of friction $\mu STR$ of the follower roller 2, coefficient of tensional elasticity E of the photosensitive belt 81 in this embodiment are similar to those in the first preferred embodiment. More concretely, the friction rings 3 are formed of electrically conductive polyacetal (POM), and are eight degrees in the angle $\phi$ of the tapering ($\phi=8°$), and 0.3 in the coefficient of friction ($\mu s=0.3$). The follower roller 2 is formed of aluminum, and is 0.1 in coefficient of friction $\mu STR$ ($\mu STR=0.1$). The photosensitive belt 81 is formed of polyimide, and its coefficient of tensional elasticity E is 18,000 N/cm² (E=18,000 N/cm²).

Thus, when the deviatory force P is so small that the deviation amount $\Delta y$ does not reach the amount $\Delta y3$, which is large enough for the steering roller 1 to be steered (at angle $\beta$), the photosensitive belt 81 can be automatically centered by the tapering (at angle $\phi$) of the friction ring 3 alone. When the deviatory force P is large enough for the deviation amount $\Delta y$ to be $\Delta y3$, the photosensitive member 81 is automatically centered by utilizing the counter deviatory force P', which is generated by rotationally moving the steering roller 1, and therefore, can be automatically centered by rotationally moving the steering roller 1 at a relatively small steering angle $\beta$. Therefore, the photosensitive belt 81 can be centered without overshooting, such as that shown in FIG. 17, and therefore, it is possible to minimize the positional image deviation in the primary scan direction, which occurs when the photosensitive belt 81 is automatically centered. In other words, not only can the photosensitive belt unit in this preferred embodiment solve the belt deviation problem, but also, can improve an image forming apparatus in terms of the color deviation in the primary scan direction. Ultimately, the employment of this photosensitive belt unit makes it possible to provide an image forming apparatus, which is inexpensive, but, is high in image quality.

Incidentally, the parameter setting for the friction ring 3a in this embodiment is nothing but an example. That is, the value for the angle $\phi$ of the tapering of the friction ring 3, and the value for the coefficient of friction $\mu s$, may be other values than those in this embodiment, as long as the their relationship allows the image forming apparatus in this embodiment to be operated in the automatic belt centering mode which is operated in two stages (FIG. 18).

The present invention makes it possible to provide such a belt centering automatic system characterized in that when an external disturbance is relatively small so that the amount of belt deviation remains below a preset value, the photosensitive belt 81 is centered by the tapering of the frictional rings 3 alone, whereas the steering roller 1 is rotationally moved only if an external disturbance which is large enough to cause the amount of belt deviation to exceed a preset value is inputted. Therefore, it becomes possible to automatically center the component in the form of an endless belt as it is circularly moved, while minimizing the change in the belt attitude, which occurs with the elapse of time. Therefore, it becomes possible to correct both of the two problems, that is, "belt deviation", and "color deviation in terms of the primary scan direction", which the belts involved in image formation have, with the employment of an inexpensive structural arrangement.

Figure 19:
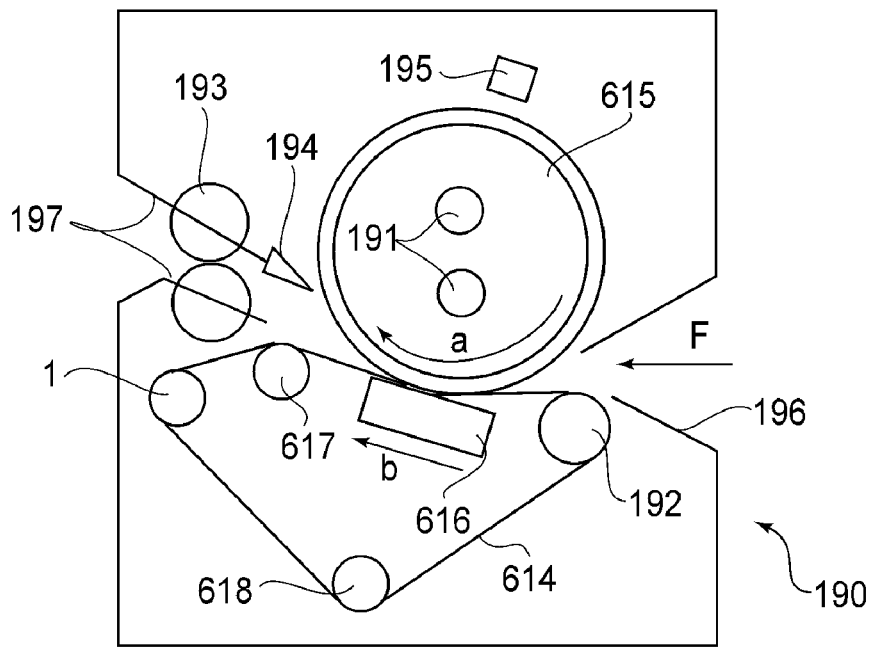
FIG. 19 is a sectional view of a belt stretched in a fixing device according to the present invention.

The belt driving apparatus, which employs the automatic belt centering system in accordance with the present invention, can be applied to a fixation belt, in addition to the intermediary transfer belt, transfer belt, and photosensitive belt, which were described above. More concretely, it can be applied to a fixing apparatus as an image heating apparatus for fixing a toner image to recording medium. Referring to FIG. 19, the fixing apparatus is of the belt type, which is made up of a fixation roller 615 as a fixing member, and a pressure belt 614. The recording medium is conveyed while remaining pinched by the fixation roller 615 and pressure belt 614. A fixing apparatus of the belt type is wider in nip, being therefore greater in the amount by which heat is given to the recording medium sheet S. Therefore, it is effective to provide an image forming apparatus which is significantly better in image quality when cardboard, coated paper, and the like, are used as recording medium, than a conventional image forming apparatus, and also, to provide an image forming apparatus which is significantly faster in image formation speed.

Next, referring to FIG. 19, a fixing apparatus 190 in this embodiment will be described. The fixing apparatus 190 has a hollow fixation roller 615, in which it has a heater 191 as a heat generating member. The electric power to the heater 191 is controlled by a control portion (CPU), with the use of a thermistor 195, which is a temperature detection member of the noncontact type, so that the temperature of the fixation roller 615 is raised to a preset level, and kept at the preset level. The fixation roller 615 is laminated; the peripheral surface of its hollow metallic core is coated with rubber. It is driven by an unshown driving force source, in the direction indicated by an arrow mark a in the drawing. The pressure belt 614, which opposes the fixation roller 615, is suspended stretched by a drive roller 192, a steering roller 1, an upstream tension roller 617, and a downstream tension roller 618, and is circularly moved in the direction indicated by an arrow mark b in the drawing. There is provided a wide fixation nip between the fixation roller 615 and pressure belt 614, by keeping the fixation roller 615 and pressure belt 614 pressed upon each other in such a manner that the pressure belt 614 is wrapped around the fixation roller 615 by a small angle, while being backed up from within the inward side of the pressure belt 614, by a pressure pad 616 as a pressure applying member, so that a preset amount of pressure is maintained between the pressure belt 614 and pressure pad 616. A recording medium sheet S having been conveyed in the direction indicated by an arrow mark F in the drawing is guided into the fixation nip by a fixation nip entrance guide 196, and is conveyed through the fixation nip while remaining pinched by the fixation roller 615 and pressure belt 614. Then, the recording medium sheet S is separated from the fixation roller 615 and pressure belt 614 with the use of the curvature of the fixation roller 615, while being assisted by a separation claw 194. Then, it is transferred to the downstream conveyance passage of the image forming apparatus, by a pair of discharge guides 197 and a pair of discharge rollers 193.

The effects similar to those obtained in the first preferred embodiment can be obtained by using the steering roller 1 in the first preferred embodiment as the steering roller for the fixing apparatus.

Incidentally, the above described effects obtainable by the present invention can be obtained by increasing the frictional portions in the preceding preferred embodiment, in the angle of the tapered portion, while reducing the frictional portions in coefficient of friction.

Further, in the case of each of the preceding embodiments, the image forming apparatus is structured so that the steering operation was carried out after the width of contact between the belt and frictional portion reached a preset value. However, the image forming apparatus structure does not need to be limited to those described above. That is, the image forming apparatuses may be structured so that the belt centering operation by the friction portions and the belt centering operation by the steering operation are carried out at about the same time.

As described above, the present invention makes it possible to reduce the change in the belt attitude, which occurs with the elapse of time, by reducing the frictional portions in coefficient of friction, and also, to generate a proper amount of belt centering force.

While the invention has been described with reference to the structures disclosed herein, it is not confined to the details set forth, and this application is intended to cover such modifications or changes as may come within the purposes of the improvements or the scope of the following claims.

This application claims priority from Japanese Patent Application No. 325793/2008 filed Dec. 22, 2008 which is hereby incorporated by reference.

What is claimed is:

1. An image forming apparatus comprising:
a photosensitive member for carrying a toner image;
a intermediary transfer belt for carrying a toner image transferred from said photosensitive member; and
steering means for stretching and steering said intermediary transfer belt, wherein said steering means includes a rotatable portion rotatable with rotation of said intermediary transfer belt, a frictional portion, provided at each opposite axial end of said rotation portion, for slidable contact with said intermediary transfer belt, supporting means for supporting said rotatable portion and each said frictional portion, and a rotation shaft rotatably supporting said supporting means, wherein said steering means is capable of steering said intermediary transfer belt by rotation thereof by forces resulting from sliding between said intermediary transfer belt and at last one frictional portion, and
wherein each of said frictional portions is made of a resin material, and is provided with an inclined surface so that the distance between the rotational axis of said rotatable portion and the surface of the frictional portion increases toward an outside with respect to the direction of a rotational axis of said rotatable portion, and wherein said intermediary transfer belt is contacted to at least one of said inclined portions.

2. An apparatus according to claim 1, wherein said frictional portions have friction coefficients to said intermediary transfer belt which are larger than that of said rotation portion.

3. An apparatus according to claim 1, wherein said steering means is adapted to steer the intermediary transfer belt such that, in a case where a deviation amount of the intermediary transfer belt in an axial direction of the intermediary transfer belt is in a range in which a difference between an axial width of contact between one of the frictional portions and the intermediary transfer belt and an axial width of contact between the other of the frictional portions and the intermediary transfer belt is not larger than a preset value, the intermediary transfer belt is centered without tilting the steering means by means of a steering means angle, and that, in a case where the deviation amount is in a range in which the difference between the axial width of contact between one of the frictional portions and the intermediary transfer belt and the axial width of contact between the other of the frictional portions and the intermediary transfer belt is larger than the preset value, centering of the intermediary transfer belt is based on the steering means angle tilting the steering means.

4. An apparatus according to claim 1, wherein said intermediary transfer belt includes a resin or metal layer as a base layer.

5. An apparatus according to claim 1, wherein said frictional portions are made of electroconductive resin material, and whose coefficient of friction to said intermediary transfer belt is smaller than that of a rubber.

6. An apparatus according to claim 1, wherein a wrapping angle on said first stretching member and a wrapping angle on said second stretching member are acute.

7. An apparatus according to claim 1, wherein a wrapping angle on said rotation portion is obtuse.

8. An apparatus according to claim 1, wherein when said intermediary transfer belt is fed, a torque required to rotate said frictional portion is larger than a torque required to rotate said rotation portion with respect to a rotational direction of said intermediary transfer belt.

9. An apparatus according to claim 1, wherein when said intermediary transfer belt is fed, said frictional portion is not rotatable with respect to the rotational direction of said belt member.

* * * * *